(12) United States Patent
Von Tschirschnitz et al.

(10) Patent No.: US 10,775,774 B2
(45) Date of Patent: Sep. 15, 2020

(54) SYSTEMS, APPARATUS, AND METHODS FOR ROBOT SWARM COORDINATION

(71) Applicant: Intel Corporation, Santa Clara, CA (US)

(72) Inventors: Maximilian Von Tschirschnitz, Munich (DE); Dibyendu Ghosh, Bangalore (IN); Karthik Narayanan, Bangalore (IN); Arjun Ram S P, Austin, TX (US); Marcel Wagner, Munich (DE); Vinayak Honkote, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 15/856,434

(22) Filed: Dec. 28, 2017

(65) Prior Publication Data

US 2019/0049931 A1 Feb. 14, 2019

(51) Int. Cl.
*G05B 19/418* (2006.01)

(52) U.S. Cl.
CPC ... *G05B 19/4186* (2013.01); *G05B 19/41815* (2013.01); *G05B 19/41865* (2013.01); *G05B 19/41895* (2013.01)

(58) Field of Classification Search
CPC .......... G05B 19/4186; G05B 19/41815; G05B 19/41865; B05B 19/41895; F41H 13/00
See application file for complete search history.

(56) References Cited

U.S. PATENT DOCUMENTS

| 6,904,335 | B2 * | 6/2005 | Solomon | ................ F41H 13/00 318/568.11 |
|---|---|---|---|---|
| 7,343,222 | B2 * | 3/2008 | Solomon | ................ F41H 13/00 318/568.11 |
| 2005/0251291 | A1 * | 11/2005 | Solomon | ................ F41H 13/00 700/245 |
| 2010/0286824 | A1 * | 11/2010 | Solomon | ................ F41H 13/00 700/248 |
| 2019/0049931 | A1 * | 2/2019 | Tschirschnitz | ... G05B 19/41815 |

(Continued)

OTHER PUBLICATIONS

Kolling et al., Human Interaction With Robot Swarms: A Survey, 2015, IEEE, p. 9-26 (Year: 2015).*

(Continued)

*Primary Examiner* — McDieunel Marc
(74) *Attorney, Agent, or Firm* — Hanley, Flight and Zimmerman, LLC

(57) ABSTRACT

Systems, apparatus, and methods to coordinate a robot swarm are disclosed. An example system includes an analyzer to create a planning message based on data associated with a first bot and a second bot, the planning message to be communicated to the swarm from a first source. In addition, the example system includes a scheduler to issue a first assignment of a first operation slot and a first role to the first bot based on the planning message, issue a second assignment of a second operation slot and a second role to the second bot based on the planning message, and create a decision message including the first assignment and the second assignment. The decision message is to be communicated to the swarm from a second source different than the first source.

28 Claims, 19 Drawing Sheets

(56) References Cited

U.S. PATENT DOCUMENTS

2020/0103867 A1* 4/2020 Von Tschirschnitz ............... G05B 19/4186

OTHER PUBLICATIONS

Li, Dual-swarm features and its challenges for system of sensor networks and mobile multi-robots, 2009, IEEE, p. 3138-3143 (Year: 2009).*

Trianni et al., Evolutionary Swarm Robotics: A Theoretical and Methodological Itinerary from Individual Neurocontrollers to Collective Behaviors, 2014, Internet, ISBN: 9780262322249, p. 153-178 (Year: 2014).*

Shirazi et al., A Strategy for Self-Organized Coordinated Motion of a Swarm of Minimalist Robots, 2017, IEEE, p. 326-338 (Year: 2017).*

Dorigo, Swarm-Bots and Swarmanoid: Two Experiments in Embodied Swarm Intelligence, 2009, IEEE, p. 1-2 (Year: 2009).*

Grob et al., Autonomous Self-Assembly in Swarm-Bots, 2006, IEEE, p. 1115-1130 (Year: 2006).*

Grady et al., Self-sssembly and morphology control in a swarm-bot, 2007, IEEE, p. 2551-2552 (Year: 2007).*

Fortunic et al., Bristle-bots in swarm robotics—approaches on agent development and locomotion, 2017, IEEE, p. 1424-1429 (Year: 2017).*

Eric Bonabeau, Marco Dorigo, and Guy Theraulaz, "Swarm intelligence: from natural to artificial systems," No. 1. Oxford University press, 1999, 320 pages.

James McLurkin, and Jennifer Smith, "Distributed algorithms for dispersion in indoor environments using a swarm of autonomous mobile robots," in 7th International symposium on Distributed Autonomous Robotic Systems, 2004, 11 pages.

Luciano CA Pimenta, Guilherme AS Pereira, Nathan Michael, Renato C. Mesquita, Mateus M. Bosque, Luiz Chaimowicz, and Vijay Kumar, "Swarm coordination based on smoothed particle hydrodynamics technique," IEEE Transactions on Robotics 29, No. 2, 2013, pp. 383-399, 17 pages.

Marco Dorigo, Mauro Birattari, Christian Blum, Maurice Cle RC, Thomas Stutzle, and Alan Winfield, "Ant Colony Optimization and Swarm Intelligence, " 6th International Conference, ANTS 2008, 1 page.

Miriam Carlos-Mancilla, Ernesto Lopez-Mellado, and Mario Siller, "Wireless sensor networks formation; approaches and techniques," Journal of Sensors, 2016, 19 pages.

Uny Y. Cao, Alex S. Fukunaga, and Andrew Kahng, "Cooperative mobile robotics: Antecedents and Directions," Autonomous Robots 4, No. 1, 1997, pp. 7-27, 21 pages.

* cited by examiner 125, 130, 135, 140, T1, A1, A2, A3, T2, T3, T4, T5, T6, RN, R1, R2, R3

SYSTEMS, APPARATUS, AND METHODS FOR ROBOT SWARM COORDINATION

FIELD OF THE DISCLOSURE

This disclosure relates generally to robots, and, more particularly, to systems, apparatus, and methods for robot swarm coordination.

BACKGROUND

Current swarm robotics utilize a plurality of individual devices to create a swarm. The devices tend to be simple, inexpensive, and homogenous and typically have limited operating resources.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
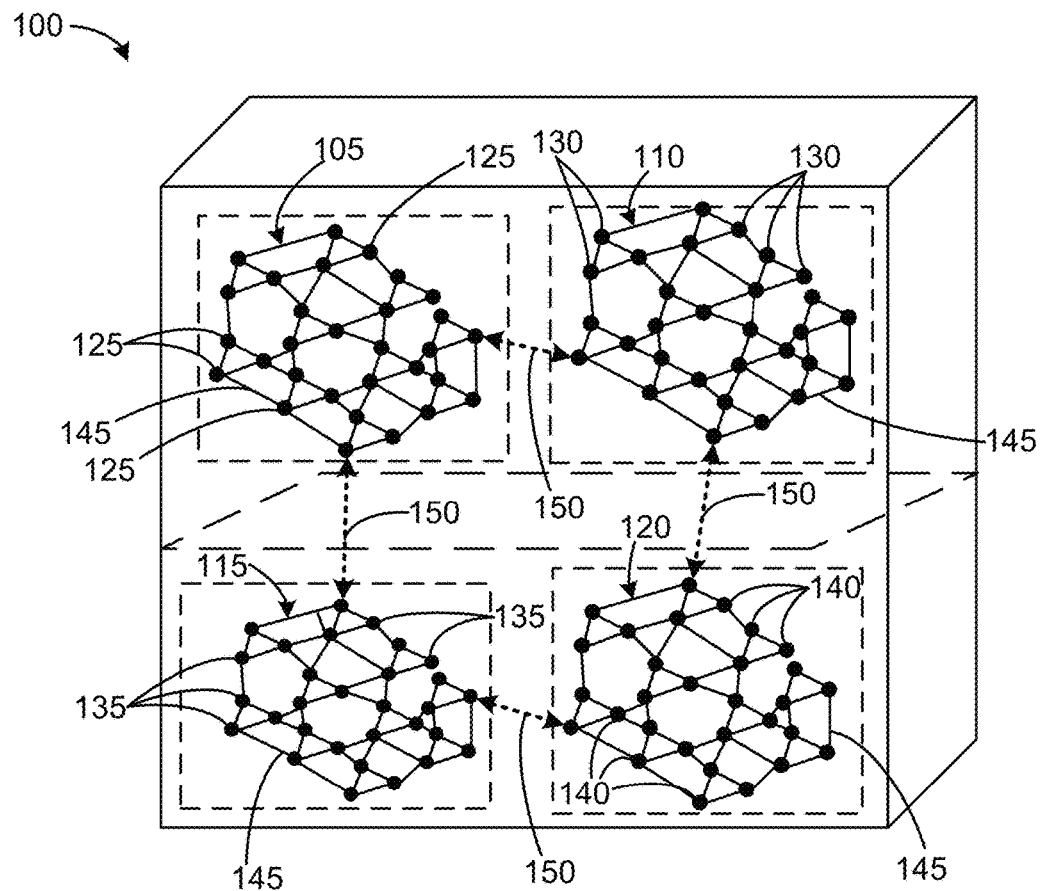
FIG. 1 is a schematic illustration of an example environment with cross-swarm communication including a plurality of example swarms with a plurality of example bots in accordance with teachings of this disclosure.

Disclosed herein are advancements to swarm robotics. An example swarm disclosed herein includes a plurality of individual autonomous devices including, for example, robots, drones, other unmanned aerial vehicles (UAVs), machines, bots, etc. Throughout this disclosure the term "bot" refers to any type of machine or device, real or virtual, that can form a swarm. Thus, a bot can be any or all of a robot, a drone, a UAV, a machine, etc. Also, a bot may be referred to herein as a tag, an anchor, a mirror, or a node.

Communication of a bot within a swarm tends to be with other bots that are nearby and usually not directly back (or through) to a central computer. However, in some examples, data from bots can be passed back to a central computer such as, for example, by being passed across a daisy chain of neighboring bots to a network access point. Nonetheless, typical swarms of robots lack central coordination. Swarm robotics is characterized by emergent behaviors or emergent properties from the plurality of bots. An emergent behavior is a behavior of a larger entity or population (e.g., a swarm) arising or emerging through interactions of component parts or individuals in the population (e.g., a plurality of bots). The larger entity exhibits behavior(s) and/or propert(ies) the individuals do not exhibit. In nature, bee hives, flocks of birds, and schools of fish exhibit emergent behavior. In the context of bots, the emergent behaviors are at least partially the result of the members of the swarm acting independently, individual bots changing instructions and/or behavior based on information received from one or more neighboring bots, and/or individual bots changing instructions and/or behavior based on behavior of one or more neighboring bots. Also, in some examples, the swarm of robots can be homogenous (i.e., identical or near-identical robots) or heterogenous (i.e., non-identical robots).

A swarm of robots increases the effectiveness of accomplishing a task compared to a single bot because a swarm of robots can solve complex problems beyond the scope of a single robot. A swarm of robots can also operate autonomously in environments that are dangerous and/or hazardous and places where human intervention is challenging or not possible (e.g., disaster sites such as areas affected by an earthquake, areas affected by radioactive contamination, areas affected by poisonous gases, firefighting environments, operations in underground mines, etc.).

Another advantage of swarm robotics is that the bots are cheaper and more easily scaled up than a single and expensive robot. In addition, swarm robots are fault tolerant and generally more flexible in terms of what tasks can be accomplished than a single robot.

There are many applications for swarms including, for example, search and rescue, mapping, ranging, surveillance, delivery, and inspection. In a search and rescue example, the bots of the swarm have instructions and shares information with a neighbor bot about whether a given area has been searched and whether a target was discovered. Based on data passed across neighboring bots, the search instructions for one or more of the individual bots may be altered. Thus, the bot influences the behavior of one or more adjacent bots. Collectively, these individual influences cause the overall behavior of the swarm to change, for example, to move to a new search area and/or better cover an existing search area. The swarm also can be scaled up simply by adding additional bots to, for example, widen a search area and/or increase the granularity of the current search within the search area.

Swarms may also be used to perform surveillance. In a surveillance scenario, there may be multiple swarm networks patrolling an area. In addition, swarms may be used for precision farming. For example, swarms can be used to search for, detect, and/or destroy insects and/or invasive plants.

Challenges with swarms include the need to coordinate amongst the swarm. For the swarm to reliably operate and effectively accomplish the desired task of the swarm, the individual bots need to have real-time and robust coordination. Further, having energy efficiency built into this co-ordination aids in prolonged operation of the bots. These concerns apply to ground based and aerial swarms. Known swarms lack the ability to coordinate the individual bots in the swarm effectively and reliably. In other words, because there is decentralized control, individual bots in a swarm base their operations on local observations of the environment and information from neighboring bots. Thus, the resulting emergent behavior that arises from a given swarm is highly variable and lacks coordination for effectively and collectively performing a task such as, for example, a task to be completed via swarm activity that an individual bot cannot accomplish. Prior attempts at swarm coordination were based on steps for accomplishing specific missions of particular task to be performed by the swarm. Thus, coordination efforts had to be reconfigured for different tasks.

Examples disclosed herein provide for a generic swarm coordination that can be implemented as an intra-swarm coordination (i.e., coordination amongst two or more bots in a swarm) and/or an inter-swarm coordination (i.e., coordination between or amongst two or more bots in a plurality of swarms). Moreover, examples disclosed are agnostic to communication protocols and bot types. For example, the bots coordinated in the swarm may be homogenous or heterogenous. Furthermore, a first bot may use a first communication protocol and a second bot may use a second communication that is different from the first communication protocol.

FIG. 1 is a schematic illustration of an example environment 100 including a first example swarm 105, a second example swarm 110, a third example swarm 115, and a fourth example swarm 120. More than four swarms or less than four swarms may be present. The first example swarm 105 is an aerial swarm that includes a first plurality of bots 125. The second example swarm 110 is also an aerial swarm that includes a second plurality of bots 130. The third example swarm 115 is a ground-based swarm that includes a third plurality of bots 135. The fourth example swarm 120 is also a ground-based swarm that includes a fourth plurality of bots 140.

In the illustrated example, the first swarm 105, the second swarm 110, the third swarm 115, and the fourth swarm 120 have intra-swarm communication channels 145 to coordinate between the respective bots of the respective swarm (i.e., bot-to-bot communication within a swarm). There are also inter-swarm (i.e., cross-swarm) communication channels 150 over which the first swarm 105, the second swarm 110, the third swarm 115, and/or the fourth swarm 120 can communication with another one of the first swarm 105, the second swarm 110, the third swarm 115, and/or the fourth swarm 120.

In some examples, the communication channels 145, 150 leverage the resources of intermediary communication equipment, which may be, for example, a base station of a cellular communication systems, satellite resources, wireless access points operating under, for example, the wi-fi protocol, etc. In other examples (e.g., where the geographic separation is not too large to prevent bot-to-bot communication), the communication channel 145, 150 may represent direct communications between and/or among one or more of the first plurality of bots 125 in the first swarm 105, one or more of the second plurality of bots 130 in the second swarm 110, one or more of the third plurality of bots 135 in the third swarm 115, and/or one or more of the fourth plurality of bots 140 in the fourth swarm 120. Thus, the communication channel 145 of FIG. 1 may represent direct (bot-to-bot) communications within a swarm and/or indirect communications between or among bots within a swarm using any suitable communications equipment and/or protocols. Further, the communication channel 150 of FIG. 1 may represent direct (bot-to-bot) communications between one or more bots in two or more swarms and/or indirect communications between one or more bots in two or more swarms using any suitable communications equipment and/or protocols.

The bots 125, 130, 135, 140 communicate over the communication channels 144, 150 (directly and/or indirectly) to share information. For example, the bots 125, 130 may exchange coverage information where the first swarm 105 is covering a first geographic area and the second swarm 110 is covering a second geographic area. In some examples, the first geographic area and the second geographic area are two areas under surveillance. In other examples, the first geographic area and the second geographic area are two fields of a farm. Other examples include other types of physical locations and/or other types of end users, goals, and/or applications.

Figure 2:
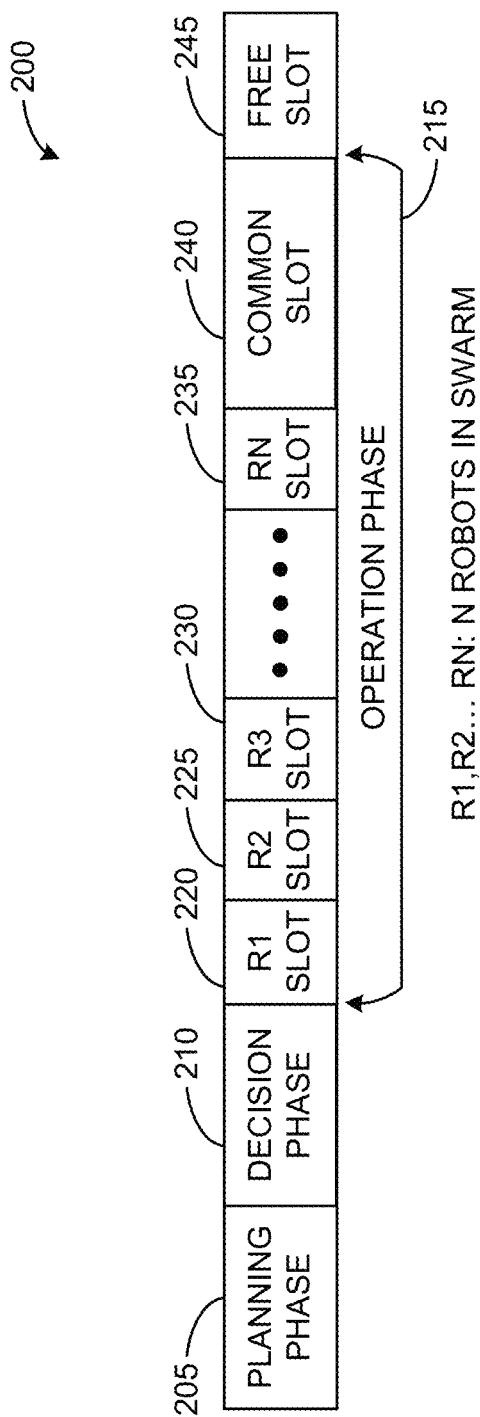
FIG. 2 is a diagram of an example swarm coordination schedule.

In examples disclosed herein, the bots 125, 130, 135, 140 coordinate over the communication channels 145, 150 to build a real-time, energy efficient, robust system with bot-to-bot coordination to accomplish a task, wherein the coordination scheme framework is impartial to the specific details of the task, the communication protocol, and/or the bot type. An example coordination scheme or schedule 200 is shown in FIG. 2. The schedule 200 is a chain-like schedule that enables different bots to coordinate with each other in a decentralized manner. A completion through the schedule 200 is referred to herein as a cycle, a chain-cycle, or a run.

In examples disclosed herein, a swarm is initiated after a threshold number of bots has joined the swarm. In some examples, the threshold number may be three bots. Other example applications may require or desire a different minimum number of bots to join before a swarm is initiated. The threshold number of bots may be determined based on the application or task to be performed by the swarm and/or the capabilities of the bots 125, 130, 135, 140.

In examples disclosed herein, the first bot to join the swarm is referred to as the top-tag robot or simply the top-tag. The top-tag waits for a minimum number of supporting bots to join the swarm, which are referred to as anchor robots or simply anchors. In some examples, the first three bots to join the swarm after the top-tag are the anchors. The identities of the top-tag and anchors are may be stored, for example, a database of one or more of the bots 125. In this example, with the identity of the top-tag and anchors established, the swarm has been initiated. Additional bots to join the swarm are referred to as tag robots or simply tags. Thus, the terms top-tag, anchor, and tag all refer to a bot (e.g., one or more of the bots 125, 130, 135, 140).

After swarm initiation, the top tag receives information from the anchors in an example planning phase 205 of the schedule 200. In the planning phase 205, the anchors compile information from, for example, one or more previous cycles through the schedule 200 and create a planning message. The planning message includes, for example, a vote by a respective anchor regarding the configuration of the swarm for the next chain cycle. The configuration of the swarm refers to a listing of the participants in the swarm for a particular cycle, an assignment of the roles or tasks an individual bot in the swarm is to perform, and a corresponding time slot for the performance. This information may be stored in a database of one or more of the bots 125.

The schedule 200 also includes an example decision phase 210 during which the top-tag analyzes the planning messages from the anchors and renders a decision as to the configuration of the swarm based on the voting. The decision of the configuration may be expressed in the form of a decision packet or message that is broadcast by the top-tag to the swarm. The decision message details the final configuration of the swarm. The bots 125 of the swarm 105 are updated with the decision message during the decision phase 210. Bots other than the top-tag T1 cannot send data during the decision phase 210 and remain ready for reception of the decision message.

The schedule 200 also includes an example operation phase 215. The operation phase 215 includes the performance of the roles or tasks by the bots to accomplish the specific coordination task of the swarm (such as, for example, ranging, data transmission, search and rescue, surveillance, etc.). As illustrated in FIG. 2, there are a number (N) bots in the swarm that have been assigned roles and time slots for performance of the roles during the operation phase 215. Tag R1 performs its task during the R1 slot 220, tag R2 performs its task during the R2 slot 225, tag R3 performs its task during the R3 slot 230, and so forth through tag RN and the RN slot 235. In some examples, during the operation phase 215, the tags only send messages or otherwise communicate with other tags during their respective time slots. Thus, Tag R2 cannot communicate with other tags or the swarm at large during the R1 slot 220. Likewise, Tag R1 cannot communicate with other tags or the swarm at during the R2 slot 225, etc. In some examples, a common slot 240 is included in the schedule 200 during which multiple tags can communicate and exchange information. Also, in some examples, the decision message is appended to the messages sent by the tags during their time slot. In such examples, the decision message will be cascaded throughout the swarm 105 as the tags operate. Rebroadcasting the decision message facilitates receipt of the decision message by all tags (and/or redundant receipt) to ensure that all tags receive the decision message including, for example, tags that may have been out of communication range, blocked by obstacles, and/or otherwise unable to receive communications (e.g., the decision message) from the top-tag during the decision phase 210.

The example schedule 200 also includes an example free slot 245, which is a period of time after the operation phase 215 but prior to the commencement of the next cycle. The example free slot 245 is dedicated to joining new bots or tags that were not part of the swarm, as disclosed in greater detail below. Thus, in some examples, a new tag may request to join the swarm. The request is not granted during the operation phase of the schedule 200. Rather, the new request to join waits until the free slot 245 for the decision to be made about its join request. In some examples, the new bot observes the running network (the swarm 105 operating through the schedule 200) for a period time until the new bot has received a decision message to know when the free slot 245 occurs. In some examples, when a join request has been granted, the anchors vote on a new configuration during the subsequent planning phase 205. The top-tag reconfigures the swarm during the subsequent decision phase 210. The new tag is assigned a role and one of the slots 220, 225, 230, 235 for the subsequent operation phase 215. In some examples, the anchors vote to reconfigure the swarm, and the top-tag reassigns roles between subsequent cycles of the schedule 200 without a new tag joining the swarm. In some examples, the new bot receives a message informing it of its acceptance into the swarm 105 and its role from one or more of the anchors, from the top-tag and/or from one or more other tags in the swarm 105 such as, for example, tags repeating the decision message.

Examples disclosed herein enable a swarm of bots to be formed in real-time in a dynamic manner by local-interaction of the bots and without centralized instructions or coordination. The local coordination enables the addition and/or deletion of bots from the swarm with minimal (or no) impact on the operation of the rest of the swarm.

As noted above, the examples disclosed herein are agnostic as to the protocol used and the types of bots included in or to be included in the swarm. In some examples, the bots 125, 130, 135, 140 include an application programming interface can communicate with any protocol. Further, in some examples, the communications use a raw read/write scheme without the need for transmission acknowledgement.

In some examples, there is no need for high accuracy clock to coordinate the swarm. In such examples, information is broadcast or otherwise communicated to and/or through the swarm more frequently to enable bot synchronization during the cycle or chain.

In some examples, redundant communication of data is prevented. The top-tag consolidates information from the anchors and broadcasts a consolidated decision message. This communication scheme decreases the communication between bots and is an advancement over known swarms in which all the bots constantly communicate with all other bots. In addition, in some examples, packet collision is avoided. The bots (in the role of a tag) are assigned an allotted a specific operation slot. The other bots cannot communicate outside of their assigned slot (or the common slot). This increases the likelihood that communications from a bot operating during its assigned slot will be received with less noise than traditional swarm communication schemes. Thus, in some examples, clear communications and predictable bot interaction and/or coordination is achieved.

In some examples, energy efficiency of the swarm is enhanced. For example, a bot (in the role of a tag) may only power up during its respective assigned operation slot in the schedule 200. During the operation slot of another bot, a bot may enter a low power mode or otherwise power down to conserve energy. Thus, in such examples, the bots in the swarm have longer operation capacity and, therefore, will need to be replaced less. With the need to replace bot less frequently, there may be less bots requesting to join the swarm during the free slot 245. Thus, there will be less join requests to process, which further decreases the operational, computational, and/or energy needs of the bots in the swarm, further enhancing the efficiency of the swarm for accomplishing a particular mission or task.

Figure 3:
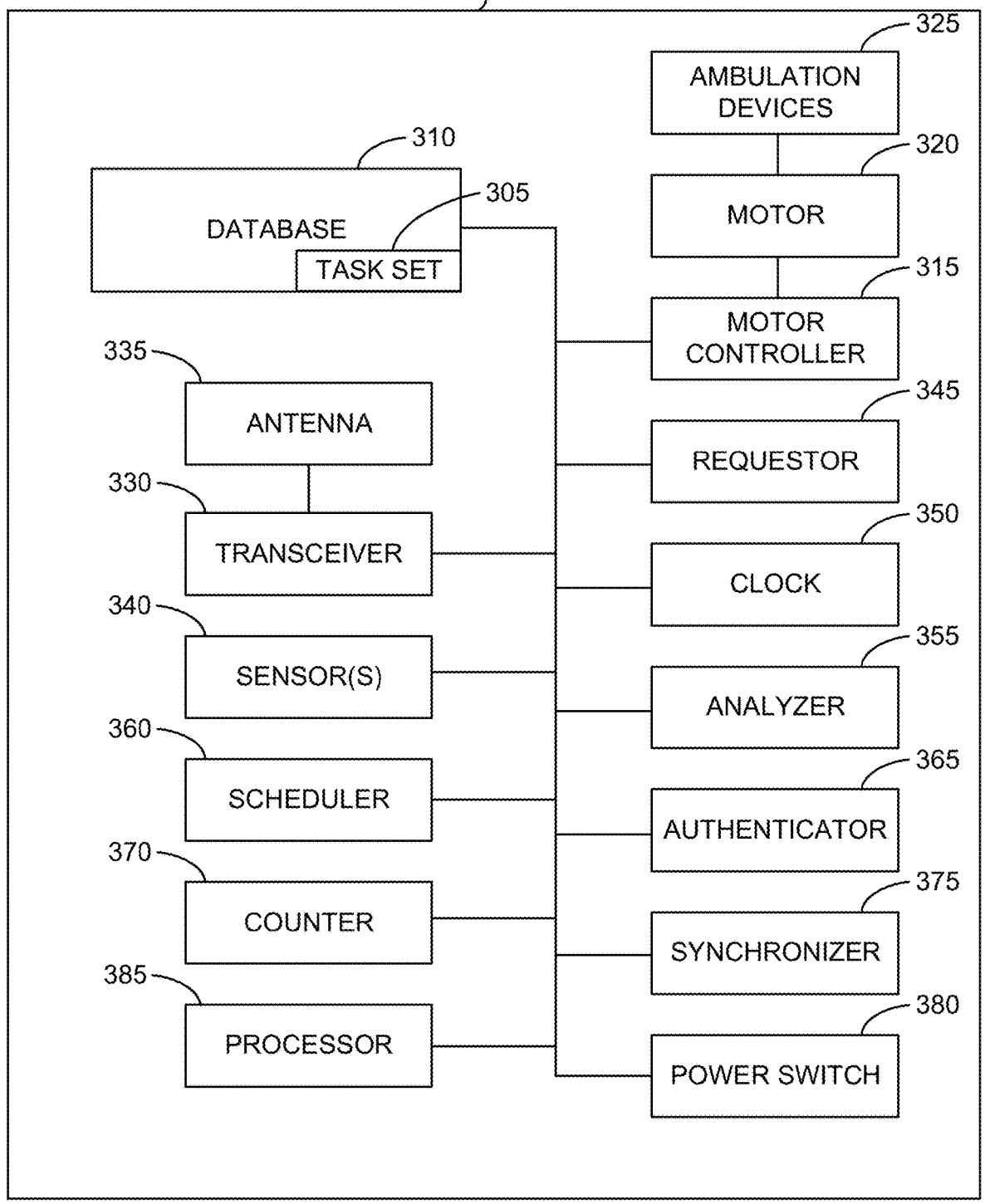
FIG. 3 is a block diagram of an example implementation of an example bot of FIG. 1.

FIG. 3 is a block diagram of an example implementation of an example bot. The bot of FIG. 3 applies to any of the example bots 125, 130, 135, 140 of FIG. 1. In addition, the example bot 125, 130, 135 is configured to, capable of, and/or designed to operate in any role disclosed herein. For example, the bot 125, 130, 135 may join the swarm as a tag in some examples. In other examples, the bot 125, 130, 135 may join the swarm as an anchor. In still other examples, the bot 125, 130, 135 may initiate the swarm as the top-tag. Also, in some examples, the bot 125, 130, 135 may join the swarm under one role but transition to another role. The bots disclosed here have the structure and functionality to assume any role in and transition between roles. Thus, the example bot of FIG. 3 also applies to the top-tag T1, the anchors A, A2, A3, the tags T2, T3, T4, T5, T6, R1, R2, R3, and/or RN of FIGS. 1, 4, 6, 7A-F, and 8.

The example bot 125 includes an example mission, work order, and/or task set 305 stored in an example database 310.

The example database 310 may be implemented by any type of volatile and/or non-volatile memory, for example, as disclosed below in connection with FIG. 13. The task set 305 provides operating commands to the bot 125 for effecting a work order and/or performing tasks. In some examples, the task set 305 is factory-installed into the memory of the bot 125. In other examples, the task set 305 is transmitted to the bot 125 at any time prior to deployment of the bot 125 for the desired operation. Any portion of or all of the task set 305 may be overwritten and/or updated at any time to, for example, initiate a new work order and/or update requirements or specifications of an existing work order. The database 310 can be used for storage and retrieval of any of the data, metrics, parameters, roles, assignments, and/or task sets or other instructions disclosed herein. In some examples the database 310 of one or more of the bots 125 stores information including, for example, a listing of the participants in the swarm for a particular cycle, the identities of the top-tag, anchors, and tags, an assignment of the roles or tasks an individual bot in the swarm is to perform, and a corresponding time slot for the performance. Though the database 310 can store information related to the roles of the bots and configuration of a swarm 105, some of the information may be historical (i.e., operational logs), and the most recent decision message includes the data that is used to identify the current swarm configuration and role assignments for the individual bots 125 of the swarm 105.

The example bot 125 also includes means for propagating. In this example, the means for propagating is implemented by an example motor controller 315 that controls an example motor 320 to operate one or more example ambulation devices 325. In some examples, the ambulation devices 325 are rotors on a drone. In other examples, the ambulation devices 325 are wheels and/or legs on a ground based robot. In yet other examples, the ambulation devices 325 are other structures that can be used to propagate the bot 125 from one position or location to another (e.g., rotors on a boat).

The example bot 125 also includes means for communicating. In this example, the means for communicating is implemented by an example transceiver, a receiver, and/or transmitter 330 and an interface such as, for example, an antenna 335. The task set 305, when loaded post-manufacturing, may be communicated to the bot 125 via the antenna 335 and transceiver 330. The bot 125 can use the transceiver 330 to communicate with one or more other bots 125, 120, 135, 140 from one or more of the swarms 105, 110, 115, 120.

The example bot 125 includes means for sensing external and/or internal data. In this example, the means for sensing is implemented by one or more example sensors 340. A variety of sensing devices may be included in the bot 125. Some examples include one or more visual sensors such as, for example, a camera. Also, some examples include one or more audio sensors such as, for example, a microphone or array of microphones. Additionally or alternatively, in some examples, the bot 125 includes one or more other sensors including, for example, a proximity sensor, a conductance sensor, a tactile sensor, a vibration sensor, a laser-based sensor, a thermal imaging sensor, and/or other desired or suitable sensors. In some examples, the sensor 240 also senses activity from other bots.

The bot 125 includes means for requesting the bot 125 join a swarm. In this example, the means for requesting is implemented as an example requestor 345. The requester 345 sends a join request message to be broadcast or otherwise communicated from the transceiver 330. The request is broadcast over a geographic area for sensing by other bots.

The bot 125 also includes an example clock 350. The clock 350 tracks the time of actions taken by the bot 125. Furthermore, the bot 125 includes means for analyzing data. In this example, the means for analyzing is implemented as an example analyzer 355. In some examples, if the request to join the swarm issued by the requestor 345 goes unanswered for a threshold amount of time based on timing data provided by the clock 350, the analyzer 355 determines that a swarm does not exist.

In some examples, if the analyzer 355 determines that a swarm does not yet exist, the requestor 345 sends another message to determine if another bot 125 has also requested to join the swarm 105. The message is broadcast over the geographic area for sensing by other bots. If the query regarding another bot 125 requesting to join the swarm issued by the requestor 345 goes unanswered for a threshold amount of time based on timing data provided by the clock 350, the analyzer 355 determines that no other bots 125 have initiated a swarm.

The bot 125 also includes means for scheduling. In this example, the means for scheduling is implemented as an example scheduler 360. In some examples, if the analyzer 355 determines that a swarm does not yet exist and no other bot 125 has begun initiation of a swarm, the scheduler 360 initiates a swarm (e.g., swarm 105) with the bot 125 in the role of a top-tag.

In other examples, the requestor 345 sends a request to join a swarm and a response is received at the transceiver 330. For example, an analyzer 355 in another bot such as, for example a bot in the role of a top-tag, can send a message in response to the join request granting permission for the bot 125 to join the swarm 105. In this example, the scheduler 360 of the bot 125 (in the role of the top-tag) will send a response that the bot 125 can join the swarm 105 along with a role assignment such as, for example, an anchor or a tag 105.

To enhance the security of the systems, apparatus, and methods disclosed herein, the bot 125 includes means for authenticating bots that request to join the swarm 105. In this example, the means for authenticating a bot are implemented by an example authenticator 365. The authenticator 365 determines if a bot requesting to join the swarm 105 is a legitimate device. The authenticator 365 reduces infiltration of malware, viruses, or other unknown entities that may be seeking to do harm. In some examples, the authenticator 365 reviews data related to, for example, encrypted key sharing. For example, the bots 125 may be assigned individual keys or a general (shared) key for the swarm 105. To exchange data and provide authentication, the authenticator 365 performs an encrypted key handshake with the bot requesting to join. Also, some examples may employ blockchain technology to make the swarm 105 more secure, autonomous, and/or flexible. Other suitable approaches to securely pair a bot with a swarm may also be used. For example, an agreed or predefined encryption/decryption mechanism can be established and known to the bots in one or more swarms working within a boundary. This agreed mechanism may be nonsensical to third party agent(s) and/or prevent such third party agent(s) from accessing encrypted data.

The example bot 125 also includes an example counter 370. The counter 370 is to maintain a list of bots that have joined the swarm 105, an order or hierarchy in which the bots have joined, a listing of tag roles of the bots and/or other data related to population identification of the swarm 105. After the counter 370 has counted a threshold number of bots 125 that have joined the swarm 105, the analyzer 355 determines that the swarm 105 has been initiated. For example, after a bot 125 in the role of top-tag has initiated the swarm 105 and three bots 125 in the role of anchors have joined, the analyzer 355, for example the analyzer 355 in the bot 125 in the role top-tag and/or any or all of the bots 125 in the role of anchors, determines that the swarm 105 has been created.

Figure 4:
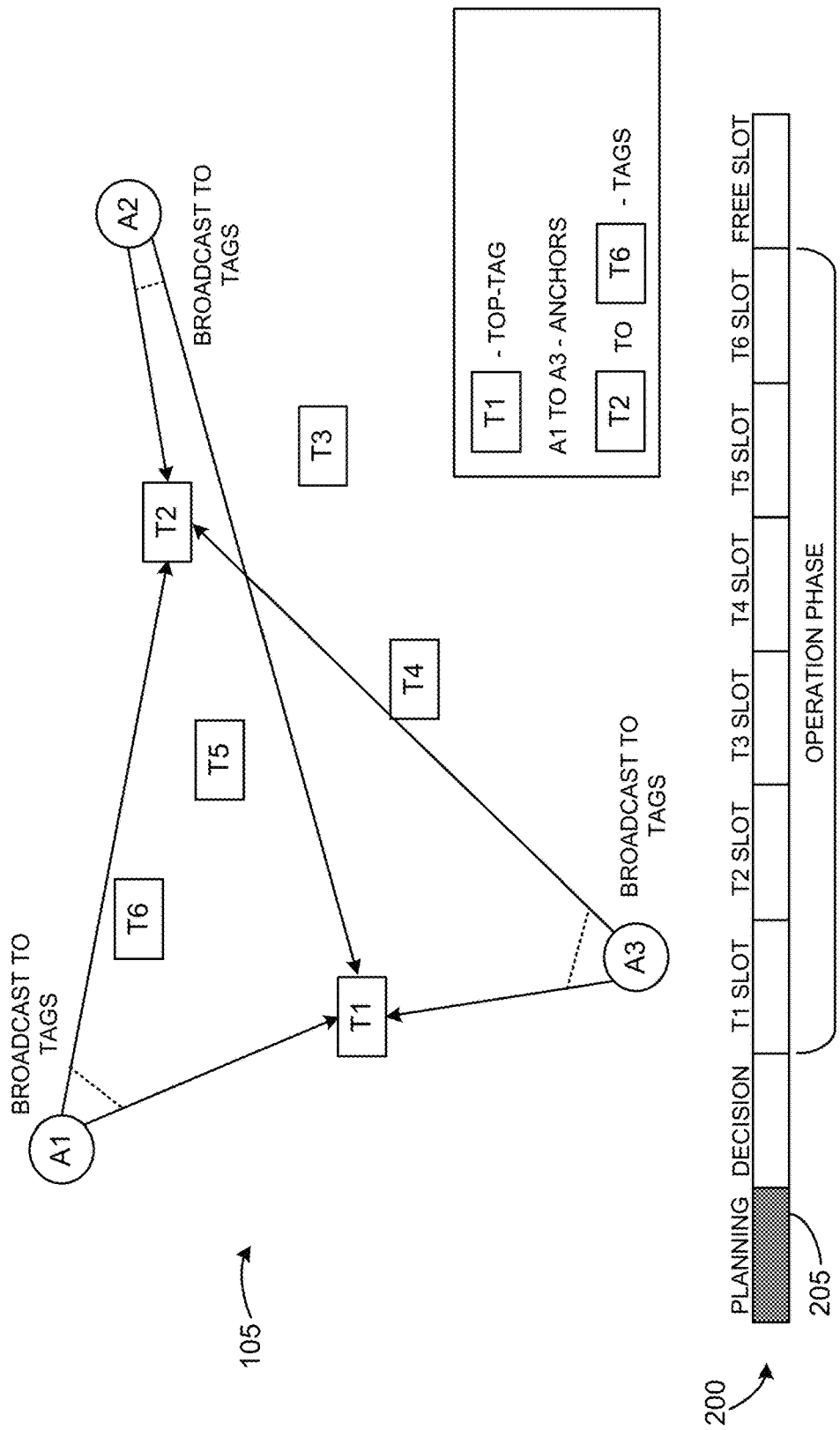
FIG. 4 is a schematic illustration of an example planning phase of the example swarm coordination schedule.

Once the swarm 105 has been created, the scheduler 360, for example of the bot 125 in the role of the top-tag, commences the coordination schedule 200. In other examples, more than the minimum number of bots 125 is joined to the swarm 105 before the scheduler 360 commences the coordination schedule 200. As shown in FIG. 2, the coordination schedule 200 includes the planning phase 205. FIG. 4 is a schematic illustration of the swarm 105 in the planning phase 205, where the swarm 105 includes nine bots, namely, a bot 125 in the role of a top-tag T1, three bots 125 in the roles of the anchors A1 to A3, and five bots in the role of the tags T2-T6. Bots T1, A1, A2, A3, T2, T3, T4, T5, and T6 all represent a bot 125, 130, 135, 140 as shown in FIGS. 1 and 3.

In the planning phase 205, the analyzers 355 of the bots 125 in the role of the anchors A1-A3 vote for the configuration of the next cycle through the schedule 200. The analyzers 355 compile data points related to, for example, identification of the bots 125 in the swarm 105 determined by the counter 370, operation data from the prior cycle including, for example, data gathered by the sensors 340, ranging data, other operational data, prior assignments of roles of the tags T2-T6, and activity that occurred during the prior free slot 245. The analyzers 355 of the bots 125 in the role of the anchors A1-A3 conduct an analysis of the data and produce voting or planning messages indicative of how the anchor wants to coordinate or configure the next cycle through the schedule 200 including, for example, what bots 125 in the role of the tags T2-T6 are assigned what roles and/or what operation slots to assist the swarm 105 in effectively accomplishing the mission or task set 305.

In the planning phase 205, the bots 125 in the role of the anchors A-A3 coordinate and broadcast or otherwise communicate via their respective transceivers 330, their respective planning messages or votes to all bots 125 in the swarm 105. In the planning phase 205, all bots 125 are listening and waiting to receive planning messages through their respective transceivers 330. Thus, in this example, information collected during a previous cycle of the schedule 200 is collected by the analyzers 355 of the bots 125 in the role of the anchors A1-A3 and communicated by the transceivers 330 of the bots 125 in the role of the anchors A1-A3 to all bots 125 in the swarm 105.

Figure 5:
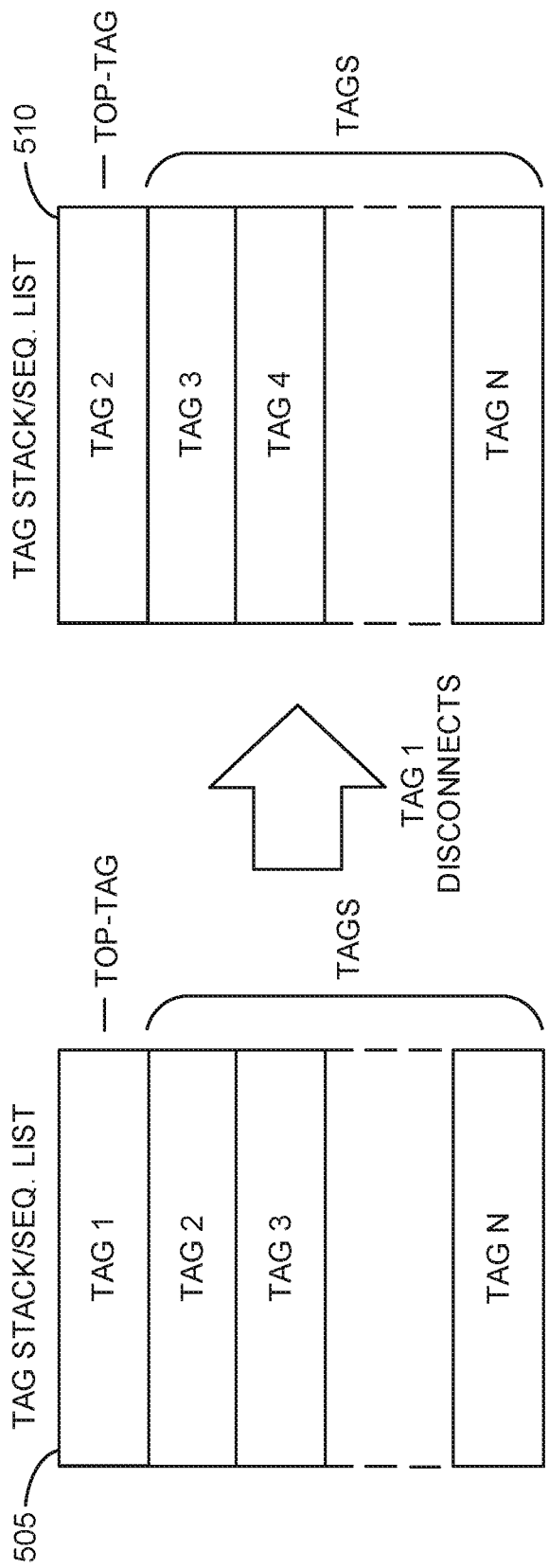
FIG. 5 is a diagram of an example tag identification list.

In the illustrated example, the analyzers 355 of the bots 125 in the role of the anchors A1-A3 compile a swarm tag identification list from their respective counters 370 into the planning messages. A first example tag identification list 505 is shown in FIG. 5. In the first tag identification list 505, the bot 125 is the role of the top-tag is TAG 1. There are N bots in the swarm 105 as shown in the first tag identification list 505. The representation of bots 125 in FIG. 5 corresponding to the bots noted above, including, for example, TAG 1 represents the bot 125 in the role of the top-tag T1, TAG 2 represents the bot 125 in the role of tag T2, TAG 3 represents the bot 125 in the role of tag T3, TAG 4 represents the bot 125 in the role of tag T4, and TAG N represents the bot 125 in the role of tag T5 and/or the bot 125 in the role of tag T6.

The analyzer 355 of the bot 125 in the role of the second tag T2 determines if the sensors 340 of the bot 125 in the role of the second tag T2 detect activity from the bot 125 in the role of the top-tag T1. If, based on data from the clock 350 of the bot 125 in the role of the second tag T2, the analyzer 355 of the bot 125 in the role of the second tag T2 determines that there has been no activity from the bot 125 in the role of the top-tag T1 during or after a threshold amount of time, the bot 125 in the role of the second tag T2 is promoted to the role of top-tag T1. The lack of activity from the bot 125 in the role of the top-tag T1 indicates that the bot 125 in the role of the top-tag T1 has disconnected from the swarm 105 voluntarily or involuntarily including, for example due to damage or other loss of resources. When the bot 125 in the role of the second tag T2 is promoted, all other bots 125 move up the hierarchy as shown in the second tag identification list 510 of FIG. 5. The transceiver 330 of the bot 125 in the role of the second tag T2 (now the tap-top T1) communicates the update to the swarm 105.

In another example, the analyzer 355 of one or more of the bots 125 in the role of the anchors A1-A3 determines if the sensors 340 of one or more of the bots 125 in the role of the anchors A1-3 detect activity from the bot 125 in the role of the top-tag T1. If, based on data from one or more of the clocks 350 of the bots 125 in the role of the anchors A1-A3, one or more of the analyzers 355 of the bots 125 in the role of the anchors A1-A3 determine that there has been no activity from the bot 125 in the role of the top-tag T1 during or after a threshold amount of time, the bot 125 in the role of the second tag T2 is promoted to the role of top-tag as noted above. One or more of the transceivers 330 of the bots 125 in the role of the anchors A1-A3 communicates the updated hierarchy as shown in the second tag identification 510 to the swarm 105. In some examples, the analyzers 355 of the bots 125 in the role of the anchors A1-A3 vote on the change in the role of the top-tag T1.

Figure 6:
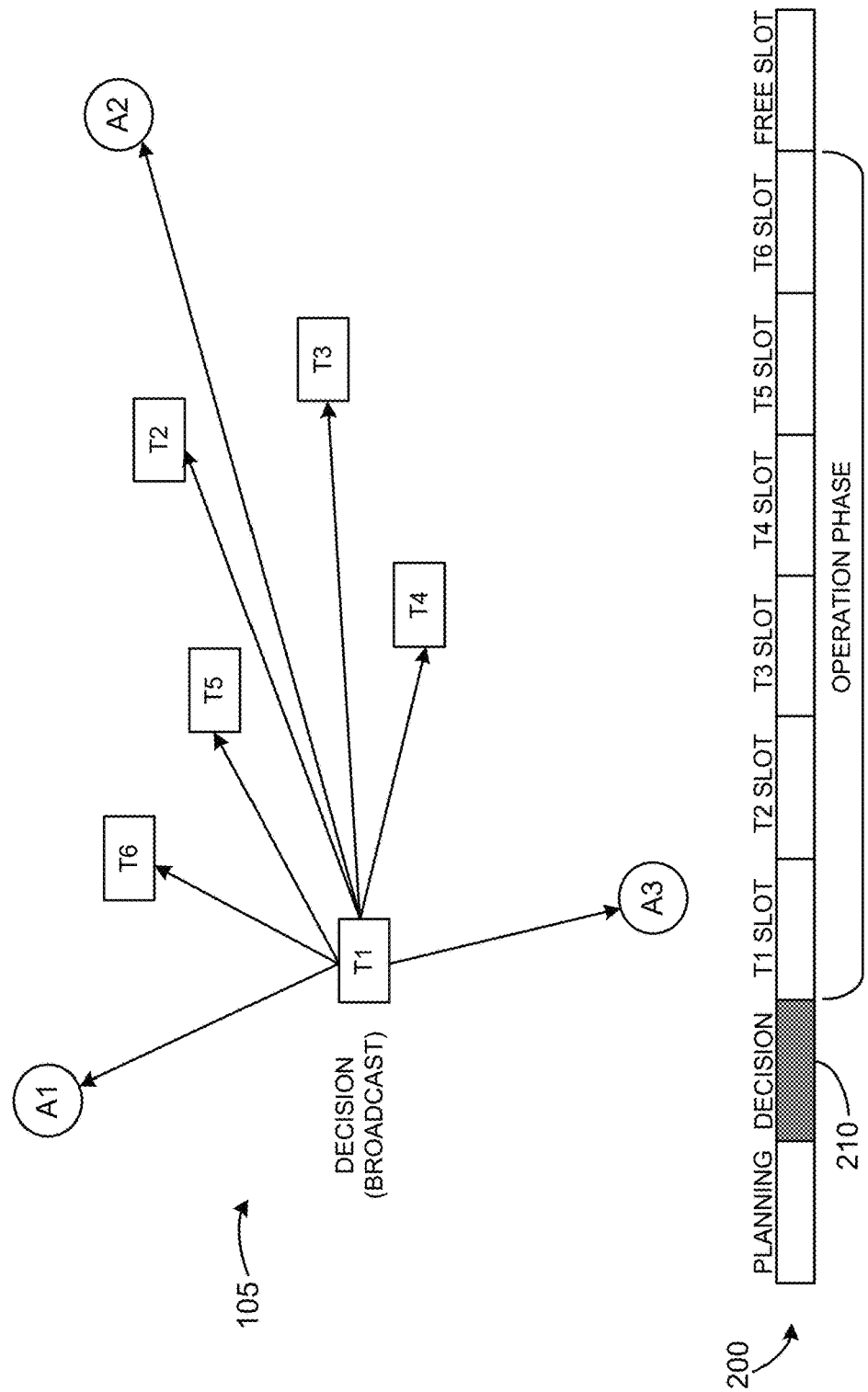
FIG. 6 is a schematic illustration of an example decision phase of the example swarm coordination schedule.

The schedule 200 advances to the decision phase 210 after the transceiver 330 of the bot 125 in the role of the top-tag T1 receives the planning messages from the bots 125 in the role of the anchors A1-A3. FIG. 6 is a schematic illustration of the swarm 105 in the decision phase 210. The analyzer 355 of the bot 125 in the role of the top-tag T1 compiles and analyzes the planning messages during the decision phase 210. The scheduler 360 of the bot 125 in the role of the top-tag T1 makes decisions based on the data from the planning messages. In the illustrated example, the scheduler 360 of the bot 125 in the role of the top-tag T1 determines what bots can join the swarm 105. Also in the illustrated example, the scheduler 360 of the bot 125 in the role of the top-tag T1 issues role assignments to the bots 125 in the role of the tags T2-T6. In addition, in the illustrated example, the scheduler 360 of the bot 125 in the role of the top-tag T1 determines what slots in the operation phase 215 correspond to what bots 125 in the role of the tags T2-T6. The example scheduler 360 of the bot 125 in the role of the top-tag T1 also calculates the duration of the slots in the operation phase 215. In addition, the example scheduler 360 of the bot 125 in the role of the top-tag T1 determines how many cycles of the operation phase 215 is to be performed before another planning phase 205 occurs. Also, the example scheduler 360 of the bot 125 in the role of the top-tag T1 reissues different assignments and roles to the bots 125 in the swarm 105 including, for example, changing the anchors and/or removing other bots 125 from the swarm 105.

The scheduler 360 of the bot 125 in the role of the top-tag T1 compiles its determinations into a decision message that is broadcast or otherwise communicated to the swarm 105 in a decision message via the transceiver 330 of the bot 125 in the role of the top-tag T1. The decision message sets the role assignments and timing for the next run or cycle through the schedule 200. In addition, along with the information disclosed above, the decision message includes other data and information. For example, the decision message can include a list of live bots, the hierarchy of the bots as shown in the tag identification lists 505, 510, and/or other relevant or desired information.

In the illustrated example, the bots 125 include synchronization means. In the example of FIG. 3, the synchronization means is implemented by an example synchronizer 375. In some examples, the synchronizer 375 includes a global timer clock. In some examples, the synchronizer 375 of the bot 125 in the role of the top-tag T1 will communicate global time to the bots 125 in the swarm 105. The synchronizers 375 in the bots 125 in the role of tags T2-T6 is updated with a timing offset for that particular tag T2-T6 and, upon receiving the decision message, the synchronizers 375 of the bots 125 throughout the swarm 105 synchronize to the global time attached to the decision message by the synchronizer 375 of the bot 125 in the role of the top-tag T1.

The analyzers 255 of the bots 125 of the swarm 105 also determine the respective positions of the bots 125 in the role of tags T2-T6 in the swarm 105 hierarchy and slots in the operation phase 215 from the decision message. Thus, bots 125 in the role of the tags T2-T6 take action and perform in accordance with decisions made by the top-tag T1. If the transceivers 230 of the bots 125 in the role of the tags T2-T6 do not receive the decision message within a threshold amount of time, the bot 125 in the role of the top-tag T1 is assumed dead or otherwise disconnected. The bot 125 in the role of the second tag T2 assumes the role of top-tag, as disclosed above.

An example structure of a decision message or decision packet created by the scheduler 360 of the bot 125 in the role of the top-tag T1 includes:

```
struct__attribute__((packed, aligned(1)))
HeaderDecisionMessage
{
            uint32_t global_timer;
            NodeID *stack;
            uint8_t *elevate_to_com
            uint8_t *com_to_elecvate;
            uint8_t anchor_stack_height;
            uint8_t planning_seed;
            uint8_t slot_size;
            uint8_t cycles_until_planning;
            float *dists;
            float xy[3][2];
            float Estxy[3][2];
            float *estimatePos;
            int TagId;
};
```

An example algorithm implemented by the swarm 105 to effect the planning phase 205 and the decision phase 210 is shown below. The algorithm can be implemented and/or coordinated across the swarm 105 including, for example, parts of the swarm such as, for example, the analyzers 355 of the bot 125 in the role of the top-tag T1 and the bots 125 in the role of the anchors A1-A3.

Example 1—Planning and Decision Phase

```
1: if last_dec_mes/pos(myself) ≥
   last_dec_mes.anchor_stack_size_then
2:      prop = CraftChainProposal(last_dec_mes.chain,
devs_seen_last_cycle)
3:      WaitUntilItsMyTurnInPlanningPhase(local_timer)
```

-continued

```
4:      Broadcast(prop)
5:      devs_seen_last_cycle.Clear( )
6:      new_dec_mes = Receive( )
7:      local_timer = last_dec_mes.global_timer
8:      if last_dec_mes.seq_num++ ≠
new_dec_mes.seq_num then
9:          DropConnection( )
10:         state - JOIN NETWORK
11:     else
12:         state = OPERATIONAL
13:     end if
14: else
15:     while InPlanningPhase(local_timer) do
16:         votes.append(Receive( ))
17:     end while
18:     while dec_node_timeout*last_dec_mes.pos(myself) <
local_timer do
19:         last_dec_mes = Receive( )
20:         local_timer = last_dec_mes.gloabl_timer( )
21:         if last_dec_mes.contains(myself) == false then
22:             state = JOIN_NETWORK
23:             return
24:         end if
25:         state = OPERATIONAL
26:         return
27:     end while
28:     if VoteCountSignificant(votes) then
29:         dec_mes = CountOut(votes)
30:         dec_mes.global_timer = local_timer
31:         Broadcast(dec_mes)
32:         last_dec_mes = dec_mes
33:         state = OPERATIONAL
34:         return
35:     end if
36:     DropConnection( )
37:     state = JOIN_NETWORK
38: end if
```

Another example algorithm includes:

Example 2—Planning and Decision Phase

```
1: {
2:      if(last_dec_mes.pos(myself) <=
last_dec_mes.anchor_stack_size) # Am I anchor?
3:      {
4:          # Act as acnhor
5:          prop = CraftChainProposal(last_dec_mes.chain,
devs_seen_last_cycle);
6:          WaitUntilItsMyTurnInPlanningPhase(local_timer); #
Timer based
7:          Broadcast(prop)
8:          devs_seen_last_cycle.Clear( );
9:
10:         new_dec_mes = Receiver( ); # Blocking !
11:         local_timer = last_dec_mes.global_timer
12:
13:         if(last_dec_mes.seq_num++ !=
new_dec_mes.seq_num)
14:         {
15:             Drop Connection( );
16:             state = JOIN_NETWORK;
17:         }
18:         else
19:         {
20:             state = OPERATIONAL;
21:         }
22:}
23: else
24: {
25:     # Listen
26:     while(InPlanningPhase(local_timer))
27:     {
28:         votes.append(Receive( )); # Nonblocking
29:     }
```

-continued

```
30:     while(DEC_NODE_TIMEOUT *
last_dec_mes.pos(myself) < local_timer)
31:     {
32:         last_dec_mes = Receive( ); # Nonblocking
33:         local_timer = last_dec_mes.gloabl_timer( );
34:         if(last_dec_mes.contains(myself) == false)
35:         {
36:             state = JOIN_NETWORK;
37:             return;
38:         }
39:         state = OPERATIONAL;
40:         return;
41:     }
42:     if(VoteCountSignificant(votes))
43:     {
44:         dec_mes = CountOut(votes);
45:         dec_mes.global_timer = local_timer;
46:         Broadcast(dec_mes);
47:         last_dec_mes = dec_mes;
48:         state = OPERATIONAL;
49:         return;
50:     }
51:     # We did not receive anything useful -> quit
52:     DropConnection( );
53:     state = JOIN_NETWORK;
54: }
55: }
```

The schedule 200 advances to the operation phase 215 after the transceiver 330 of the bot 125 in the role of the top-tag T1 communicates the decision message, and the synchronizers 375 and analyzers 355 of the bots 125 in the role of the tags T2-T6 prepare the tags T2-T6 for performance of the task 305. FIGS. 7A-F are schematic illustrations of the swarm 105 in the operation phase 215.

The example bots 125 also include an example power switch 380 as shown in FIG. 3. The power switch 380 communicates with the clock 350 and the synchronizer 375 and powers up the bot 125 during a slot in the operational phase 215 assigned to the bot 125 so the bot 125 can perform its portion of the task 305 assigned in that slot. The bot 125 also includes means for executing the task set 305. In this example, the means for executing is implemented by an example processor 385. In some examples, after the processor 385 effects performance of the task assigned to a bot 125 in a slot of the operational phase 215, the power switch 380 powers the bot 125 down to a low power mode. In some examples, the transceiver 230 of the bot 125, though powered down, continues to receive communications from the swarm 105. However, the transceiver 230 of the bot 125 only transmits to other bots during its allotted slot.

In some examples, the motor controller 315, the requestor 345, the clock 350, the analyzer 355, the scheduler 360, the authenticator 365, the counter 370, the synchronizer 375, and/or the power switch 380 are implemented by the processor 385. In some examples, the motor controller 315, the requestor 345, the clock 350, the analyzer 355, the scheduler 360, the authenticator 365, the counter 370, the synchronizer 375, the power switch 380 and/or the processor 385 are implemented by a processor such as disclosed below in connection with FIG. 13.

Figure 7A:
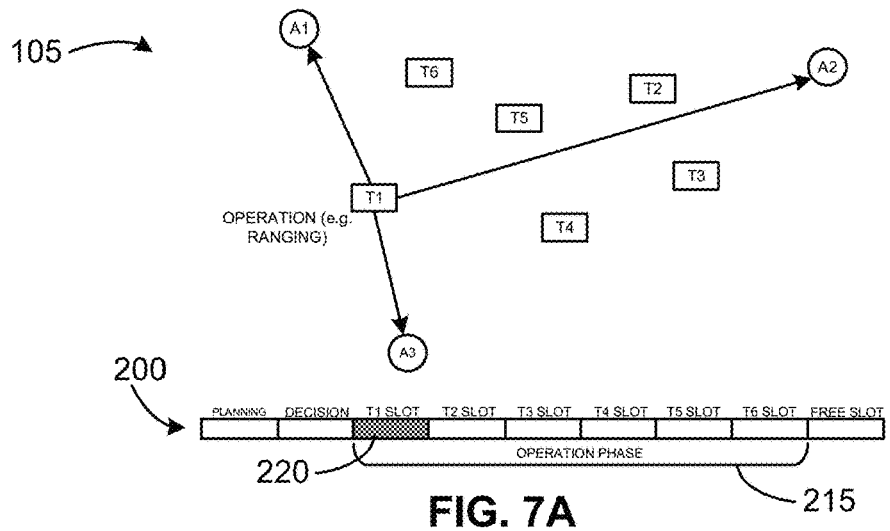
FIGS. 7A-7F are schematic illustrations of an example operation phase of the example swarm coordination schedule.

FIG. 7A shows the first time slot 220 of the operation phase 215 of the schedule 200. In the first time slot 220, the processor 385 of the bot 125 in the role of top-tag T1 performs the duties or tasks assigned to the bot 125 in the role of the top-tag T1. The power switches 380 of the bots in the roles of the tags T2-T6 have been triggered so the bots 125 in the roles of the tags T2-T6 are in a low power mode. In the first time slot 220, the bot 125 in the role of top-tag T1 can communicate data or other information to the swarm 105. The remaining bots 125 can only listen in this example.

Figure 7B:
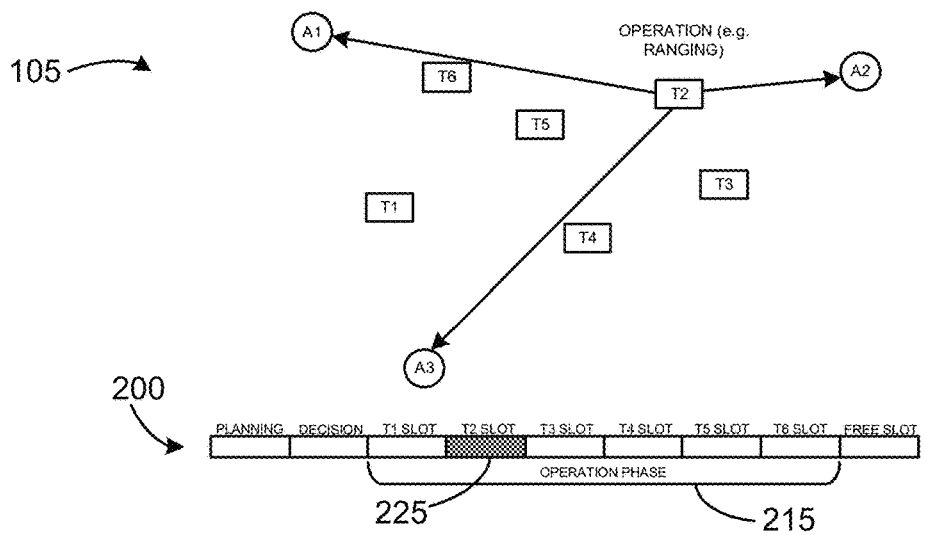

FIG. 7B shows the second time slot 225 of the operation phase 215 of the schedule 200. In the second time slot 225, the power switch 380 of the bot 125 in the role of the second tag T2 activates to power up the bot 125 in the role of the second tag T2. In this state, the processor 385 of the bot 125 in the role of the second tag T2 performs the duties or tasks assigned to the bot 125 in the role of the second tag T2. The power switches 380 of the bots in the roles of the tags T3-T6 have not been triggered so the bots 125 in the roles of the tags T3-T6 remain in a low power mode. In the second time slot 225, the bot 125 in the role of the second tag T2 can communicate data or other information to the swarm 105. The other bots 125 in the roles of the tags T3-T6 can only listen in this example.

Figure 7C:
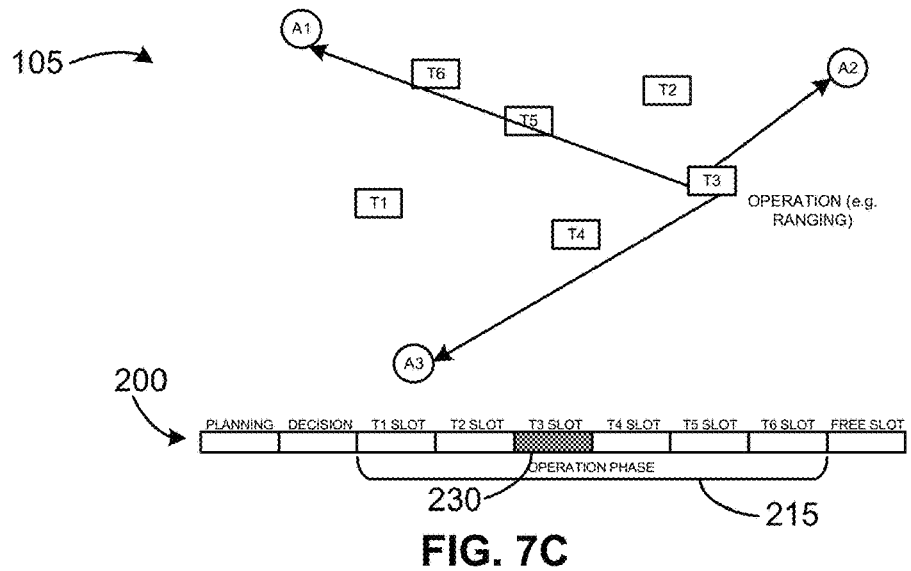

FIG. 7C shows the third time slot 230 of the operation phase 215 of the schedule 200. In the third time slot 230, the power switch 380 of the bot 125 in the role of the second tag T2 activates to power down the bot 125 in the role of the second tag T2. In addition, the power switch 380 of the bot 125 in the role of the third tag T3 activates to power up the bot 125 in the role of the third tag T3. In this state, the processor 385 of the bot 125 in the role of the third tag T3 performs the duties or tasks assigned to the bot 125 in the role of the third tag T3. The power switches 380 of the bots in the roles of the tags T4-T6 have not been triggered so the bots 125 in the roles of the tags T2, T4-T6 are in a low power mode. In the third time slot 230, the bot 125 in the role of the third tag T3 can communicate data or other information to the swarm 105. The other bots 125 in the roles of the tags T2, T4-T6 can only listen in this example.

Figure 7D:
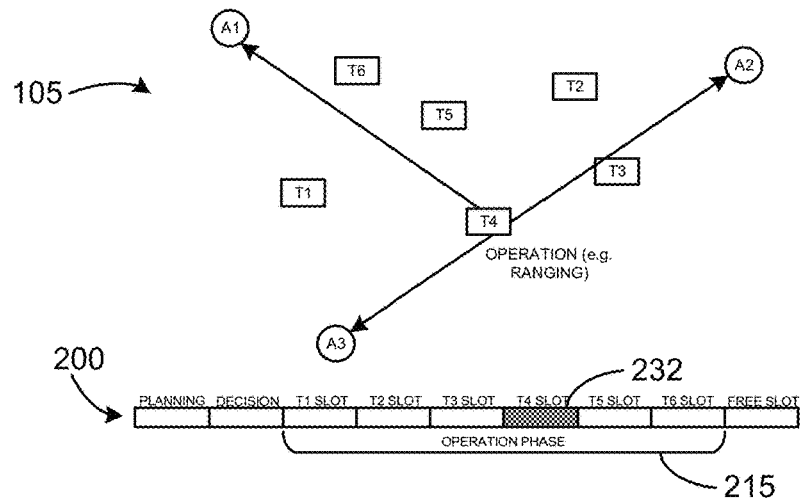

FIG. 7D shows a fourth time slot 232 of the operation phase 215 of the schedule 200. In the fourth time slot 232, the power switch 380 of the bot 125 in the role of the third tag T3 activates to power down the bot 125 in the role of the third tag T3. In addition, the power switch 380 of the bot 125 in the role of the fourth tag T4 activates to power up the bot 125 in the role of the fourth tag T4. In this state, the processor 385 of the bot 125 in the role of the fourth tag T4 performs the duties or tasks assigned to the bot 125 in the role of the fourth tag T4. The power switches 380 of the bots in the roles of the tags T2, T5, T6 have not been triggered so the bots 125 in the roles of the tags T2, T3, T5, T6 are in a low power mode. In the fourth time slot 232, the bot 125 in the role of the fourth tag T4 can communicate data or other information to the swarm 105. The other bots 125 in the roles of the tags T2, T3, T5, T6 can only listen in this example.

Figure 7E:
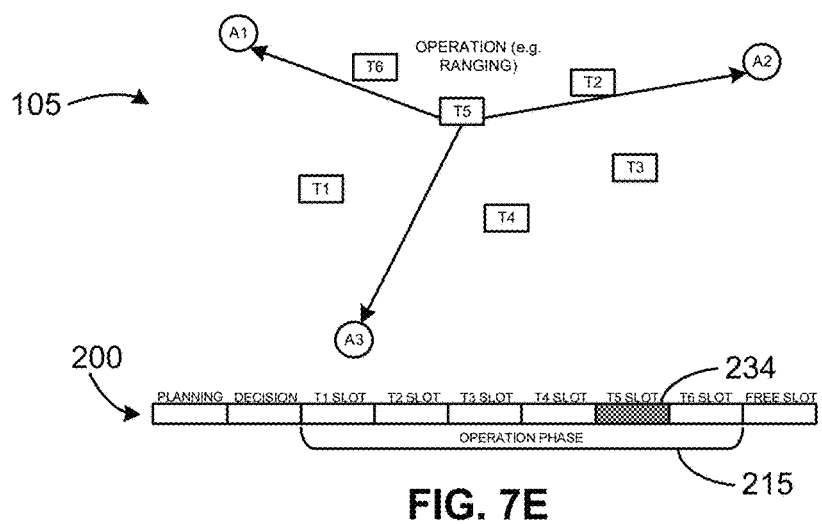

FIG. 7E shows a fifth time slot 234 of the operation phase 215 of the schedule 200. In the fifth time slot, 234 the power switch 380 of the bot 125 in the role of the fourth tag T4 activates to power down the bot 125 in the role of the fourth tag T4. In addition, the power switch 380 of the bot 125 in the role of the fifth tag T5 activates to power up the bot 125 in the role of the fifth tag T5. In this state, the processor 385 of the bot 125 in the role of the fifth tag T5 performs the duties or tasks assigned to the bot 125 in the role of the fifth tag T5. The power switches 380 of the bots in the roles of the tags T2, T3, T6 have not been triggered so the bots 125 in the roles of the tags T2-T4, T6 are in a low power mode. In the fifth time slot 234, the bot 125 in the role of the fifth tag T5 can communicate data or other information to the swarm 105. The other bots 125 in the roles of the tags T2-T4, T6 can only listen in this example.

Figure 7F:
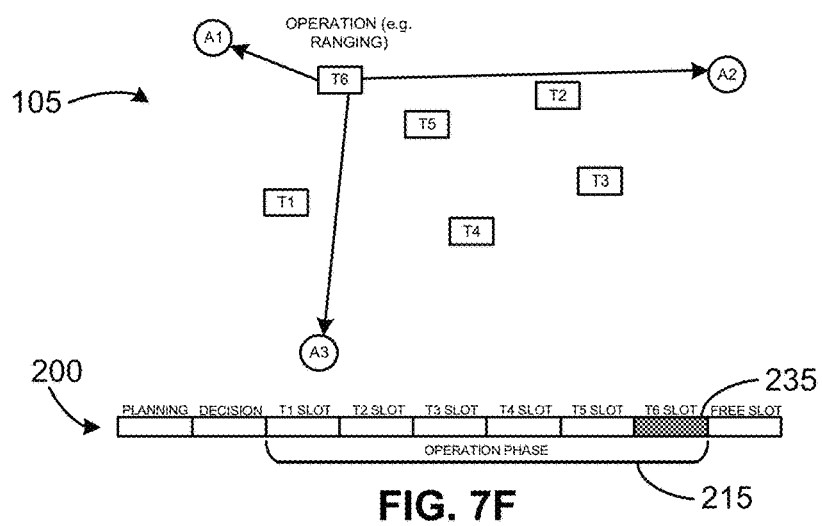

FIG. 7F shows a sixth time slot 235 of the operation phase 215 of the schedule 200. In the sixth time slot 235, the power switch 380 of the bot 125 in the role of the fifth tag T5 activates to power down the bot 125 in the role of the fifth tag T5. In addition, the power switch 380 of the bot 125 in the role of the sixth tag T6 activates to power up the bot 125 in the role of the sixth tag T6. In this state, the processor 385 of the bot 125 in the role of the sixth tag T6 performs the duties or tasks assigned to the bot 125 in the role of the sixth tag T6. The power switches 380 of the bots in the roles of the tags T2-T4 have not been triggered so the bots 125 in the roles of the tags T2-T5 are in a low power mode. In the sixth time slot 235, the bot 125 in the role of the sixth tag T6 can communicate data or other information to the swarm 105. The other bots 125 in the roles of the tags T2-T5 can only listen in this example.

Though six time slots were shown in the operation phase 215 of FIGS. 7A-F, the scheduler 360 of the bot 125 in the role of the top-tag T1 can establish any number of slots in an operation phase 215. In some examples, the operation phase 215 has less time slots, and in other examples, the operations phase 215 has more time slots. In some examples, the number of time slots is dependent on the type of task to be performed and/or the capabilities of the bots 125 in the swarm 105.

In some examples, the operation phase 215 further includes a common slot. In a common slot, two or more bots 125 can communicate and coordinate activity. In other words, in a common slot, the power switches 380 of two more of the bots 125 in the role of the tags T2-T6 activate to power up the two or more bot 125 in the role of the tags T2-T6. In this state, the processors 385 of the two or more bots 125 in the role of the tags T2-T6 perform the duties or tasks assigned to the two or more bots 125 in the role of the tags T2-6 including, for example, coordination and/or communication exchanges between the two bots 125. In the common time slot 225, the two or more bots 125 in the role the tags T2-T6 that have been activated can both (or all) communicate data or other information to the swarm 105.

An example algorithm implemented by the swarm 105 to effect the operation phase 215 is shown below. The algorithm can be implemented and/or coordinated across the swarm 105 including, for example, parts of the swarm such as, for example, the analyzers 355 of the bots 125 in the role of the top-tag T1 and the bots 125 in the role of the tags T2-T6.

Example 3—Operation Phase

```
1: if SLOT_SIZE*last_dec_mes.pos(free_slot) > local.timer then
2:     state = PLANNING_AND_DECISION
3: end if
4: if last_dec_mes.pos(myself) > las_dec_mes.anchor_stack_size then
5:     devs_seen_last_cycle.append(Receive( ).msg_id)
6: else
7:     while ( SLOT_SIZE*last_dec_mes.pos(myself) < local_timer and
               SLOT_SIZE * (last_dec_mes.pos(myself) + 1) > local_timer )
         do
8:         my_payload.header.append(last_dec_mes)
9:         Broadcast(my_payload)
10: end if
```

Another example algorithm for the operation phase 215 is shown below.

Example 4—Operation Phase

```
 1: {
 2:     if(SLOT_SIZE * last_dec_mes.pos(free_slot) > local.timer) # Still in operational phase ?
 3:     {
 4:         state = PLANNING_AND_DECISION;
 5:     }
 6:     if(last_dec_mes.pos(myself) > las_dec_mes.anchor_stack_size) # Am I anchor?
 7:     {
 8:         devs_seen_last_cycle.append(Receive( ).msg_id);
# Non blocking
 9:     }
10:     else
11:     {
12:         while(SLOT_SIZE * last_dec_mes.pos(myself) > local_timer && SLOT_SIZE * (last_dec_mes.pos(myself) + 1) > local_timer )
13:         {
14:             # Broadcast dec_message and take care of your own transmission business
15:             my_payload.header.append(last_dec_mes);
16:             Broadcast(my_payload);
17:             ...
18:         }
19:     }
20: }
```

Another example algorithm for the planning phase 205, decision phase 210, and operation phase 215 includes:

Example 5—Main

```
 1: main( )
 2: {
 3:     switch(state)
 4:     {
 5:         caseOPERATIONAL:
 6:             OperationalPhase( )
 7:             break;
 8:         casePLANNING_AND_DECISION:
 9:             PlanningAndDecisionPhase( );
10:             break;
11:     }
12: }
```

Figure 8:
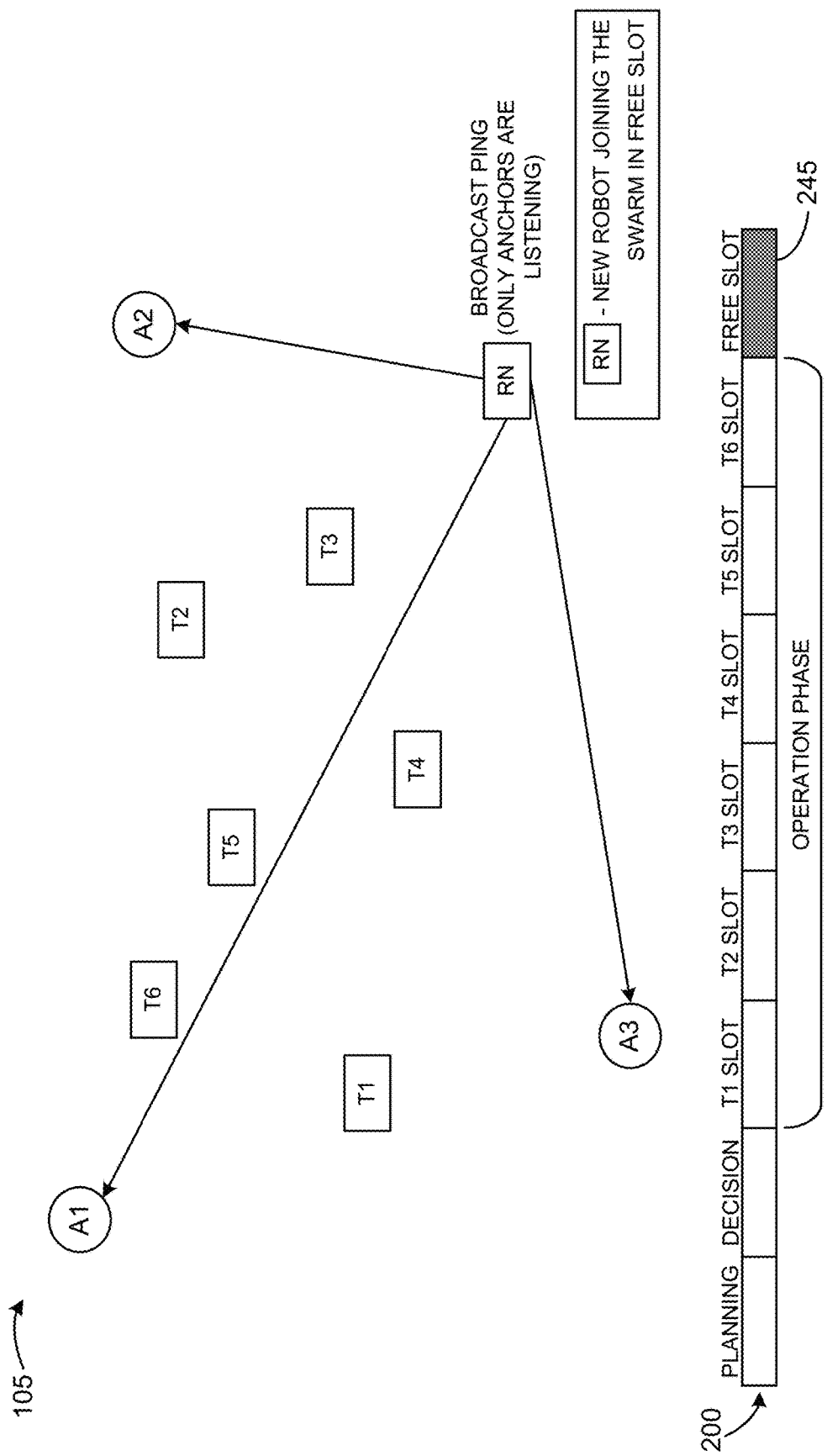
FIG. 8 is a schematic illustration of an example free slot of the example swarm coordination schedule.

The example scheduler 360 of the bot 125 in the role of the top-tag T1 also incorporates a free slot 245 into the schedule 200, an example of which is depicted in FIG. 8. The free slot 245 occurs after the operation phase 215 and before the next planning phase 205 or the next operation phase 215 (when the operation phase has multiple cycles before a planning phase 204). During the free slot 245, there is no activity of the bots 125 performing mission duties to remove active transactions from the bots 125 in the role of the tags T2-T6 and to enable a new bot 125 (RN) to request to join the swarm 105. Thus, the bots 125 in the role of tags T2-T6 are inactive in the free slot 245.

In some examples, the transceiver 330 of the bot 125 in the role of the top-tag T1 broadcasts a signal that indicates the activation of the free slot 245. The signal may include other information such as, for example, the tag identification list 505, 510 of FIG. 5. The transceiver 330 in any bot 125 within communication range of the swarm 105 can detect the signal. In other examples, the new bot 125 observes the swarm 105 during operation of the schedule 200 and learns of the scheduling of the free slot 245 from a detected decision messages. When determining to join the swarm 105, the analyzer 355 of the new bot 125 (RN) determines if the tag identification of that bot 125 (RN) is included in an existing list. If the new bot 125 (RN) is not included in the tag identification list, the requestor 345 of the new bot 125 (RN) formulates a request to join the swarm 105 that includes a randomness added to the exact transmission time in the free slot 245. The transceiver 330 of the new bot 125 (RN) broadcasts a signal such as, for example, a ping that includes a request to join.

The transceivers 330 of any of the bots 125 in the role of the anchors A1-A3 detects the ping from the new bot 125 (RN) and adds the new bots 125 (RN) to the voting list for consideration by the analyzers 355 of the bots 125 in the role of the anchors A1-A3 during the next planning phase 205. In the next decision phase 210, information about the new bot 125 (RN) and other information from all of the bots 125 in the roles of the anchors A1-A3 is used by the analyzer 355 and scheduler 360 of the bot 125 in the role of top-tag T1 to render a decision of whether the new bot 125 (RN) is added to the swarm. If added, the new bot 125 (RN) will be added to the tag identification list 505, 510. In some examples, the new bot 125 (RN) receives a message that it has been added to the swarm 105 from one or more of the bots 125 in the role of the anchors A1-A3. In other examples, the message indicative of the granting of permission to join the swarm 105 is received by the new bot 125 (RN) from the bot 125 in the role of the top-tag T1 and/or from one or more bots 125 in the role of a tag T2-T6.

If the scheduler 360 of the bot 125 in the role of the top-tag T1 does not add the new bot 125 (RN) to the swarm 105, the new bot 125 (RN) waits for the next free slot 245 to repeat the attempt. In some examples, two or more new bots 125 (RN) apply at the same time to join the swarm 105. The join request from the requestor 345 of one or more of the new bots 125 (RN) may be overheard or otherwise obfuscated by noise and/or other requests to join. In such examples, the new bot 125 (RN) whose join request was obscured and went unanswered waits for the scheduling of the next free slot 245 as indicated by the next decision message and reapplies to join the swarm 105 during the next cycle of the schedule 200.

While an example manner of implementing the example bot 125 of FIGS. 1, 4, 6, 7A-F, and 8 is illustrated in FIG. 3, one or more of the elements, processes and/or devices illustrated in FIG. 3 may be combined, divided, re-arranged, omitted, eliminated and/or implemented in any other way. Further, the example task set 305, the example database 310, the example motor controller 315, the example transceiver 330, the example sensors 340, the example requestor 345, the example clock 350, the example analyzer 355, the example scheduler 360, the example authenticator 365, the example counter 370, the example synchronizer 375, the example power switch 380, the example processor 385 and/or, more generally, the example bot 125 of FIGS. 1, 3, 4, 6, 7A-F, and 8 may be implemented by hardware, software, firmware and/or any combination of hardware, software and/or firmware. Thus, for example, any of the example task set 305, the example database 310, the example motor controller 315, the example transceiver 330, the example sensors 340, the example requestor 345, the example clock 350, the example analyzer 355, the example scheduler 360, the example authenticator 365, the example counter 370, the example synchronizer 375, the example power switch 380, the example processor 385, and/or the example bot 125 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, task set 305, the example database 310, the example motor controller 315, the example transceiver 330, the example sensors 340, the example requestor 345, the example clock 350, the example analyzer 355, the example scheduler 360, the example authenticator 365, the example counter 370, the example synchronizer 375, the example power switch 380, the example processor 385 and/or, more generally, the example bot 125 are hereby expressly defined to include a non-transitory computer readable storage device or storage disk such as a memory, a digital versatile disk (DVD), a compact disk (CD), a Blu-ray disk, etc. including the software and/or firmware. Further still, the example bot 125 of FIGS. 1, 3, 4, 6, 7A-F, and 8 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic or machine readable instructions for implementing the example bot 125 of FIGS. 1, 3, 4, 6, 7A-F, and 8 for swarm coordination is shown in FIGS. 9A-D. The machine readable instructions may be a program or portion of a program for execution by a processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9A-D, many other methods of implementing the example bot 125 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9A-D may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 9A:
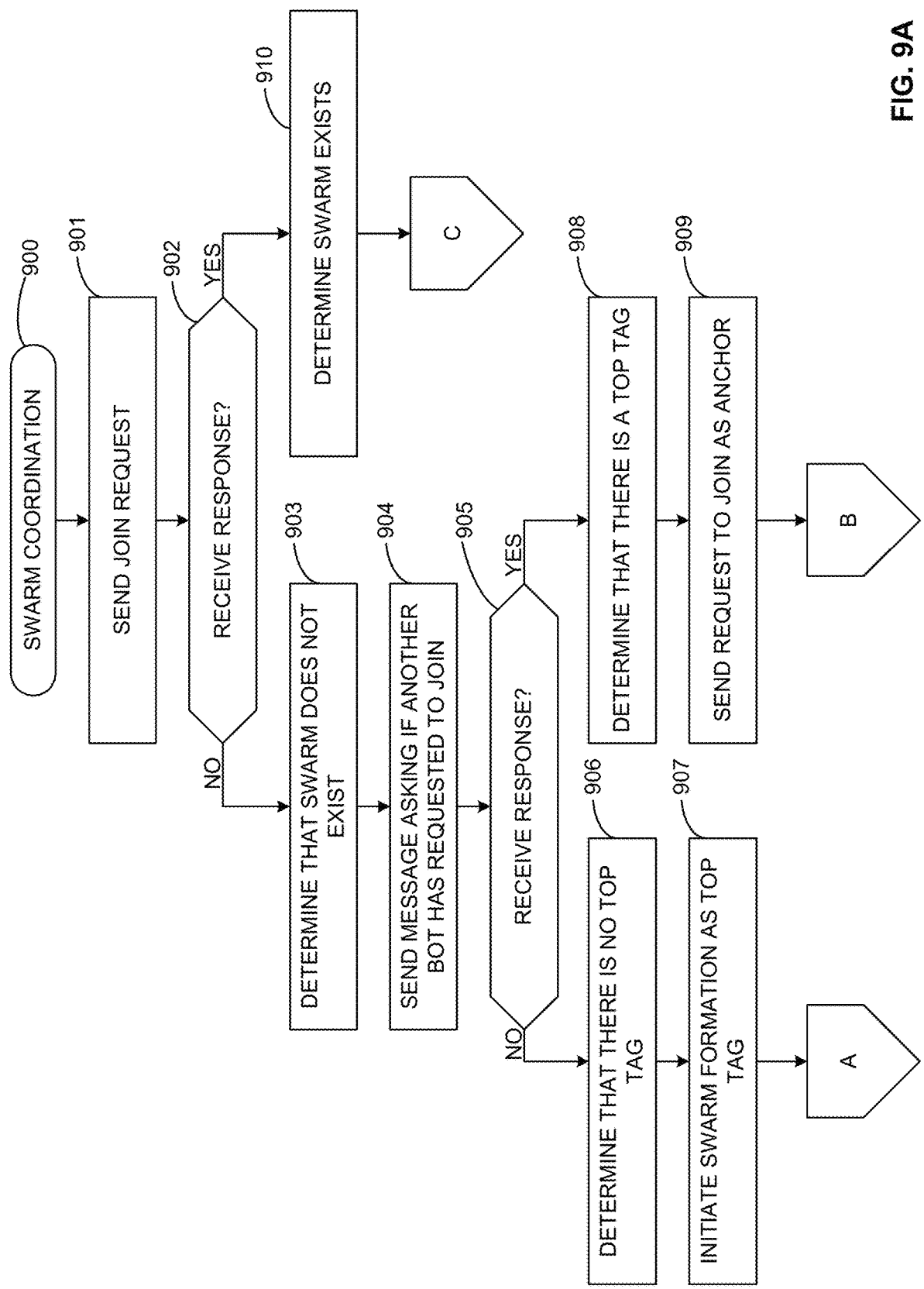
FIGS. 9A-D is a flow chart representative of example machine readable instructions that may be executed by one or more processors to implement the example bots of FIGS. 1, 3, 4, 6, 7A-F, and 8.

FIGS. 9A-D illustrates an example of swarm coordination 900 that begins in FIG. 9A with the requester 345 of a bot 125 sending a join request message communicated from the transceiver 330 (block 901). The analyzer 355 of the bot 125 determines if a response has been received (block 902). In some examples, the analyzer 355 access data from the clock 350, which tracks the time since the communication, so that if the request to join the swarm goes unanswered for a threshold amount of time, the analyzer 355 determines that a swarm does not exist (block 903).

If the swarm does not exist, the requestor 345 sends a message to determine if another bot 125 has also requested to join the swarm 105 (block 904). Determining if another bot 125 has joined the swarm 105 will identify if a bot 125 in the role of the top-tag exists. The analyzer 355 of the bot 125 determines if a response has been received (block 905). In some examples, the analyzer 355 access data from the clock 350 to determine if the query regarding another bot 125 requesting to join the swarm goes unanswered for a threshold amount of time. If the analyzer 355 determines that there has been no response received, the analyzer 355 determines that there is no bot 125 in the role of the top-tag (block 906).

Figure 9B:
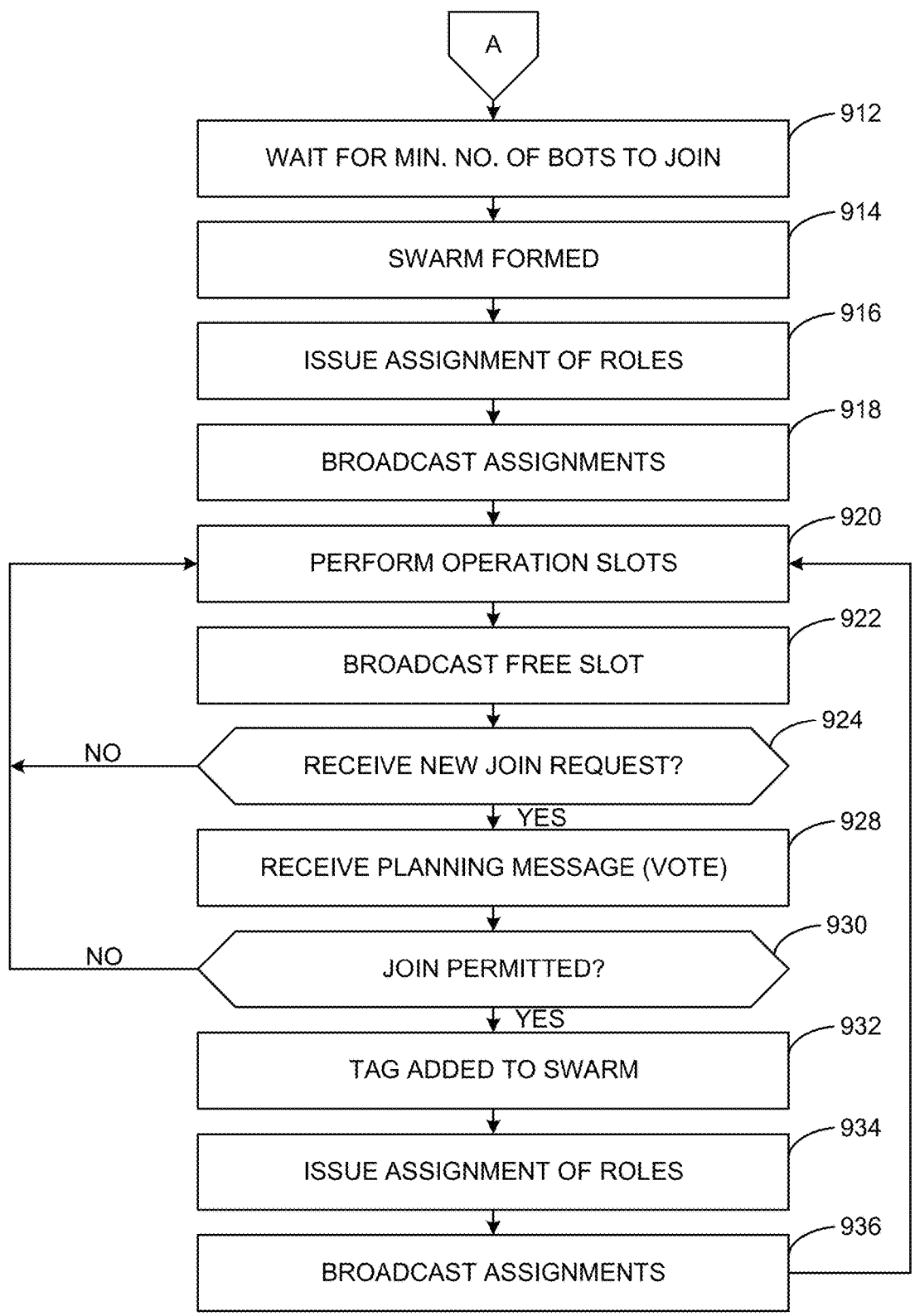

If the analyzer 355 determines that a swarm does not yet exist (block 903) and there is no bot 125 in the role of the top-tag (block 906), the scheduler 360 initiates swarm formation with the bot 125 in the role of a top-tag (block 907). This bot 125 then proceeds through the swarm coordination process 900 functioning as the top-tag T1 as shown in FIG. 9B.

If the query regarding another bot 125 requesting to join the swarm (i.e., the existence of the top-tag) issued by the requestor 345 is answered (e.g., the transceiver 330 receives a response message) (block 905), the analyzer 355 determines that there is a bot 125 in the role of the top-tag (block 908). In some examples, the analyzer 355 of a bot 125 in the role of the top-tag T1 sends a message that it exists and is initiating a swarm.

Figure 9C:
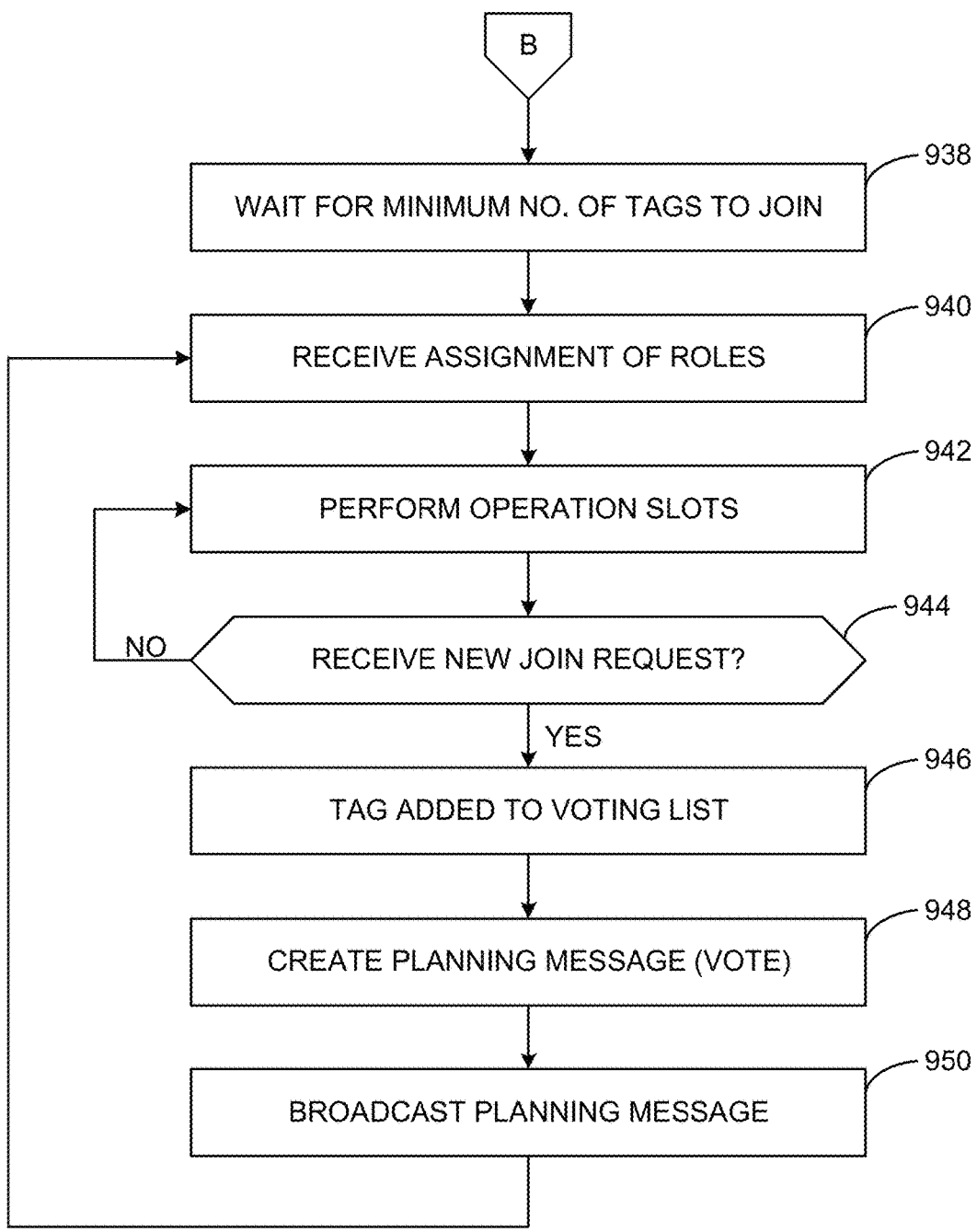

If the analyzer 355 determines that a swarm does not yet exist (block 903) but that there is a bot 125 in the role of the top-tag T1 (block 908), the requester 345 sends a request to join the swarm 105 as in the role of an anchor (block 909). In some examples, the response from the bot 125 in the role of the top-tag T1 that it (the top-tag) exists also includes permission for the second (or later) bot 125 to join the swarm 125 and has the role of an anchor. This bot 125 then proceeds through the swarm coordination process 900 functioning as an anchor A1 as shown in FIG. 9C.

Figure 9D:
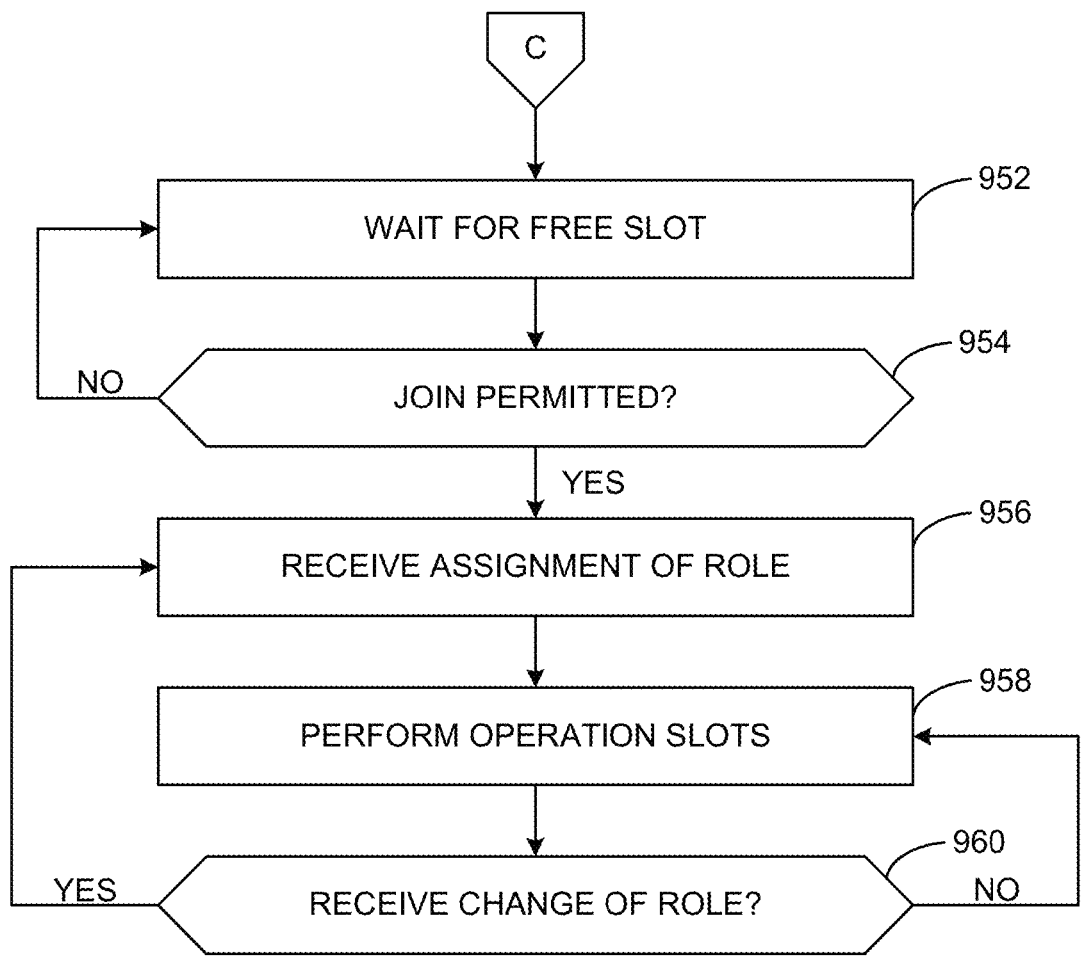

If, at block 902, the analyzer 355 receives a response from another bot including, for example, a bot 125 in the role of the top-tag T1 and/or a bot 125 in the role of the anchor A1 indicating that the swarm 105 exists, the analyzer 355 determines that the swarm exists (block 910). This bot 125 proceeds through the swarm coordination process 900 functioning as new bot 125 (RN) as shown in FIG. 9D.

As shown in FIG. 9B, after the scheduler 360 of the bot 125 in the role of the top-tag T1 initiates swarm formation, the counter 370 the bot 125 in the role of the top-tag T1 counts the number of bots that have joined the swarm 105 and the bot 125 in the role of the top-tag T1 waits for a minimum number of bots to join the swarm 105 (block 912). When the counter 370 identifies that a minimum number of bots 125 has joined the swarm 105, the analyzer 355 of the bot 125 in the role of the top-tag T1 determines that a swarm (e.g., swarm 105) has formed (block 914).

The scheduler 360 of the bot 125 in the role of the top-tag T1 issues assignment of roles (block 916). For example, the scheduler 360 considers votes and/or planning messages from bots 125 in the roles of anchors A1-A3, reliability of the bots 125, operational history of the bots 125, location of the bots 125, accessibility of the bots 125 by other bots 125, the task set 305, operating times, prior cycles of the schedule 200, and/or other information important to the completion of the mission. The assignment of roles issued by the scheduler 360 of the bot 125 in the role of the top-tag T1 determines the operational performance and time slot for the performance for the other bots 125 in the swarm 105. After the scheduler 360 of the bot 125 in the role of the top-tag T1 issues the assignments (block 916), the transceiver 330 of the bot 125 in the role of the top-tag T1 broadcasts the assignments to the swarm 105 (block 920).

The swarm coordination process 900 also includes the processors 385 of the bots 125 in the swarm performing the operation slots (e.g., in the operation phase 215) (block 920). The processor 385 of the bot 125 in the role of the top-tag T1 performs the task assigned to itself in the T1 slot 220 of the operation phase 215.

After the performance of the slots in the operation phase 215 (block 920), the transceiver 330 of the bot 125 in the role of the top-tag T1 broadcasts the activation of the free slot 245 (block 922). During the free slot 245, new bots 125 such as, for example, bot 125 (RN), request to join the swarm 105. The transceiver 330 of the bot 125 in the role of the top-tag T1 receives the request to join from the new bot 125 (RN) (block 924). If the analyzer of the bot 125 in the role of the top-tag T1 determines that the transceiver 330 of the bot 125 in the role of the top-tag T1 has not received a request to join from a new bot (block 924) based on, for example, data provided by the clock 350, the scheduler 360 of the bot 125 in the role of the top-tag T1 continues the schedule 200 with a subsequent cycle of the operation phase 215. Thus, the process 900 continues with the processors 385 of the bots 125 of the existing swarm 105 performing their respective operation slots (block 920).

In some examples, the transceiver of the bot 125 in the role of the top-tag T1 does receive a request to join from the new bot 125 (RN) (block 922). In such examples, the analyzer 355 of the bot 125 in the role of the top-tag T1 receives planning messages (including, for example, votes) from the bots 125 in the role of the anchors A1-A3 that includes data related to the new bot 125 (RN), swarm configuration data, and other information disclosed above (block 928). The scheduler 360 of the bot 125 in the role of the top-tag T1 renders a decision as to whether the new bot 125 (RN) can join the swarm 105 (block 930).

If the scheduler 360 of the bot 125 in the role of the top-tag T1 rejects the request from the new bot 125 (RN) to join the swarm 105 (block 930), the scheduler 360 of the bot 125 in the role of the top-tag T1 continues the schedule 200 with a subsequent cycle of the operation phase 215 where the process 900 continues with the processors 385 of the bots 125 of the existing swarm 105 performing their respective operation slots (block 920). In some examples, new assignments of roles of the bots 125 in the swarm 105 are issued by the scheduler 360 before the subsequent performance of the operation slots (block 920), regardless of whether the scheduler 360 of the bot 125 in the role of the top-tag T1 rejects the join request from the new bot 125 (RN) or not.

If the scheduler 360 of the bot 125 in the role of the top-tag T1 accepts the join request of the new bot 125 (RN) (block 930), the scheduler 360 of the bot in the role of the top-tag T1 adds the new bot 125 (RN) to the swarm 105 in the role of a tag such as, for example, the second tag T2 (block 932). After scheduler 360 of the bot in the role of the top-tag T1 adds the bot 125 in the role of the tag T2 to the swarm 105, the scheduler 360 of the bot 125 in the role of the top-tag T1 issues assignments of the roles for the bots 125 in the swarm (block 934). For example, the scheduler 360 of the bot 125 in the role of the top-tag T1 may maintain the roles of all bots 125 previously in the swarm 105 and assign a new role to the bot 125 in the role of the tag T2. In other examples, the scheduler 360 the bot 125 in the role of the top-tag T1 re-assigns role for one or more of the bots 125 in the swarm 105. After the scheduler 360 of the bot 125 in the role of the top-tag T1 issues (or reissues) the assignments (block 934), the transceiver 330 of the bot 125 in the role of the top-tag T1 broadcasts the assignments to the swarm 105 (block 936). The scheduler 360 of the bot 125 in the role of the top-tag T1 continues the schedule 200 with a subsequent cycle of the operation phase 215, in which the process 900 continues with the processors 385 of the bots 125 of the existing swarm 105 performing their respective operation slots (block 920).

As shown in FIGS. 9A and 9C, after the analyzer 355 determines that there is a top-tag (block 908) and the requester 345 sends a request to join the swarm in the role of an anchor (block 909), the bot 125 in the role of the anchor waits for a minimum number of bots to join the swarm 105 (block 938). The swarm coordination process 900 from the perspective of the bot 125 in the role of the anchor continues when the transceiver 330 of the bot 125 in the role of the anchor receives its assignment (block 940) as the anchor A1 from the scheduler 360 of the bot 125 in the role of the top-tag T1.

The swarm coordination process 900 also includes the processors 385 of the bots 125 in the swarm performing the operation slots (e.g., in the operation phase 215) (block 940). The processor 385 of the bot 125 in the role of the anchor A1 performs the task assigned to it during the operation phase 215 (block 944) by the scheduler 360 of the bot 125 in the role of the top-tag T1. In some examples, the assignment of the bot 125 in the role of the anchor A1 includes using its transceiver 330 to listen to the swarm 105 and using its sensor(s) 340 to gather data related to activity of the bots 125 in the swarm and of new bots 125 (RN) attempting to join the swarm.

After the operation phase 215, a free slot 245 is activated during which new bots 125 such as, for example, bot 125 (RN), request to join the swarm 105. Thus, after the performance of the operation slots (block 942), the analyzer 355 of the bot 125 in the role of the anchor A1 determines if the transceiver 330 of the bot 125 in the role of the anchor A1 receives the request to join from the new bot 125 (RN) (block 944). If the analyzer 355 of the bot 125 in the role of the anchor A1 and the analyzers 355 of the bots 125 in the role of other anchors A2, A3 and/or the top-tag T1 do not determine that the transceivers 330 of the respective bot 125 have received a request to join from a new bot (block 944) based on, for example, data provided by the clock 350, the schedule 200 is continued with a subsequent cycle of the operation phase 215, in which the process 900 continues with the processors 385 of the bots 125 of the existing swarm 105 performing their respective operation slots (block 942).

If the analyzer 355 of the bot 125 in the role of the anchor A1 determines that the transceiver 330 of the bot 125 in the role of the anchor A1 does receive a request to join from the new bot 125 (RN) (block 944), the analyzer 355 of the bot 125 in the role of the anchor A1 adds the tag identification for the new bot 125 (RN) to the voting list (block 946).

The analyzer 355 of the bot 125 in the role of the anchor A1 creates a planning message (e.g., including a vote) related to the configuration of the next cycle through the schedule 200 (block 948). The analyzer 355 of the bot 125 in the role of the anchor A1 basis the planning message on an analysis of data related to, for example, identification of the bots 125 in the swarm determined by its counter 370, operational data from the prior cycle, data from its sensors 340, ranging data, prior assignments of roles of the bots 125 in the swarm 105, and activity that occurred during the prior free slot 245. The analyzer 355 of the bot 125 in the role of the anchor A1 creates the planning message to indicate how the bot 125 in the role of the anchor A1 wants to coordinate or configure the next cycle through the schedule 200 including, for example, what bots 125 are assigned what roles and/or what operation slots to assist the swarm 105 in effectively accomplishing the mission or task set 305.

The transceiver 330 of the bot 125 in the role of the anchor A1 broadcasts the planning message to the swarm 105 (block 950). The process 900 from the perspective of the bot 125 in the role of the anchor A1 continues with the bot 125 in the role of the anchor A1 waiting until the bot 125 in the role of the top-tag T1 has analyzed the planning message and rendered a decision regarding issuance of roles for the bots 125 in the swarm 105. When assignment roles have been broadcast from the bot 125 in the role of the top-tag T1, the transceiver 330 of the bot 125 in the role of the anchor A1 receives the assignment of roles (block 940). The process 900 continues through a subsequent performance of the operation phase 215 where the bots 125 perform the operation slots (block 942).

As shown in FIGS. 9A and 9D, after the requestor 345 of the new bot 125 (RN) requests to join the swarm 105 (block 901), the transceiver 330 of the new bot 125 (RN) waits to detect the activation of a free slot (e.g., free slot 245) (block 952).

If the analyzer 355 of the new bot 125 (RN) determines that the transceiver 330 of the new bot (RN) does not receive a message granting permission to join the swarm 105 within a threshold period of time based on data from its clock 350, the analyzer 355 of the new bot 125 (RN) determines that the request to join is not permitted (block 954). The requestor 345 of the new bot 125 (RN) waits for a subsequent free slot 245 to issue a subsequent request to join the swarm 105 (block 952). In some examples, the requestor 345 of the new bot 125 (RN) issues a subsequent request to join swarm 105 before the subsequent frees slot 245 but waits the subsequent free slot for a decision (block 952). In some examples, one or more of the analyzers 355 of the bots 125 in the role of the anchors A1-A3 may have voted against allowing the new bot 125 (RN) to join the swarm 105 and the scheduler 360 of the bot 125 in the role of the top-tag T1 may have decided not to permit the new bot 125 (RN) to join the swarm 105 because, for example, the resources of the new bot (RN) may not be needed or the new bot 125 (RN) may lack necessary resources, the task 305 of the swarm 105 may be accomplished, a time period may have expired, and/or other reasons.

If the analyzer 355 of the new bot 125 (RN) determines that the transceiver 330 of the new bot (RN) has received a message granting permission to join the swarm 105 (block 954), the transceiver 355 of the new bot 125 (RN) receives an assignment of role (block 956). For example, the scheduler 360 of the bot 125 in the role of the top-tag T1 may have issued a role to the new bot 125 (RN) as a tag T2 and broadcast that role to the new bot (RN).

The schedule 200 continues with a subsequent cycle of the operation phase 215 during which the bots 125 perform the operation slots (block 958). The performance of the operation slots (block 958) includes, in some examples, the power switch 380 of the bot 125 in the role of the tag T2 powering down the bot 125 in the role of the tag T2 until the assigned operation slot (e.g., slot T2 225) approaches. When the assigned operation slot approaches, the power switch 380 of the bot 125 in the role of the tag T2 powers up the bot 125 in the role of the tag T2, and the processor 385 of the bot 125 in the role of the tag T2 performs the assigned activity or task. After the assigned operation slot, the power switch 380 of the bot 125 in the role of the tag T2 powers down to make the bot 125 in the role of the tag T2 inactive during the performance of the remaining operation slots by the rest of the swarm 105.

While the bot 125 in the role of the tag T2 remains inactive during all other phases of the schedule 200, its transceiver 330 continues to listen for communications. Thus, if new (additional) bots 125 (RN) join and/or roles are otherwise reconfigured based on activity from the analyzers 355 of the bots 125 in the role of the anchors A1-A3 and/or activity from the analyzer 355 and/or scheduler 360 of the bot 125 in the role of the top-tag T1, the transceiver 330 of the bot 125 in the role of the tag T2 receives an indication of the change in role (block 960) and receives the details of the new assignment (block 956). The schedule 200 continues through a subsequent operation phase 215 in which the bots 125 of the swarm 105 perform their operation slots (block 958).

In other examples, the transceiver 330 of the bot 125 in the role of the tag T2 does not receive any indication of a change of role (block 960), and the power switch 380 and processor 385 of the bot 125 in the role of the tag T2 continue to operate in accordance with its assigned role during the operation slots (block 958).

Figure 10A:
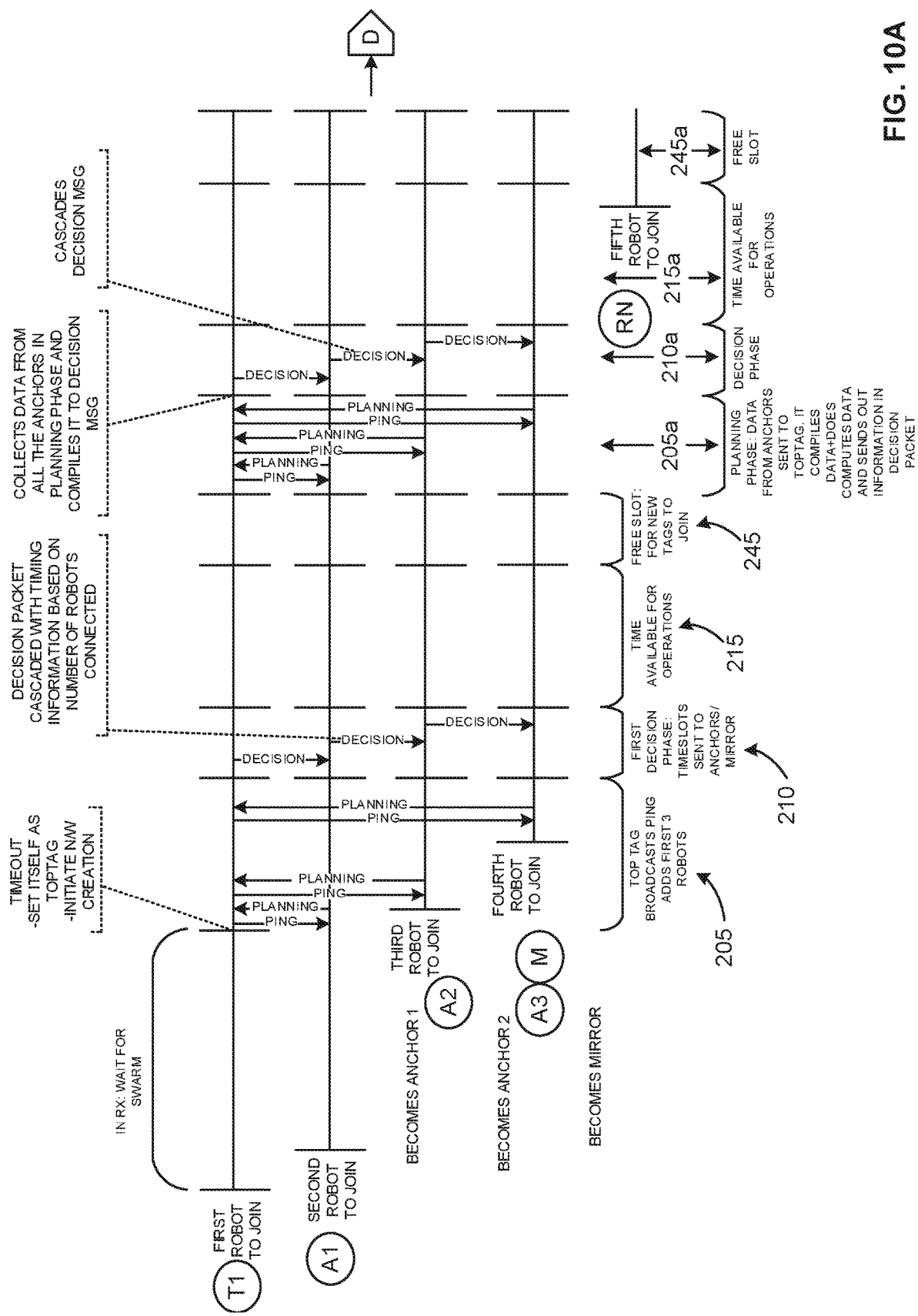
FIGS. 10A-D is an example time line of an example operation of the example bots of FIGS. 1, 3, 4, 6, 7A-F, and 8 and the example instructions of FIGS. 9A-D.

FIGS. 10A-D show an example timeline of an example implementation of the systems, apparatus, and methods disclosed herein. Specifically, FIGS. 10A-D show the example bots (e.g., bot 125) implemented in a swarm coordination where the task 305 is ranging. Ranging is a cooperative process that determines the range between two transceivers (e.g., transceiver 330 in different bots 125). As shown in FIG. 10A, the first bot 125 joins the swarm 105 and then, after a period of time based on data from the clock 350 and the transceiver 330, the analyzer 355 determines there are no other bots 125 in the swarm 105 and sets the bot 125 with the role of the top-tag T1.

The transceiver 330 of the bot 125 in the role of top-tag T1 sends out communications (shown as pings) to join three bots 125 in the role of anchors A1-A3. In the example with the ranging implements, the third bot 125 to join in the role of the anchor A3 is referred to as a mirror M. The bots 125 in the role of the anchors A1, A2 and the mirror send planning message to the bot 125 in the role of the top-tag T1 in a planning phase (e.g., planning phase 205). The bot 125 in the role of the top-tag T1 renders the decision message in a decision phase (e.g., decision phase 210). In this example, the decision message or packet is cascaded with timing information based on the number of bots 125 in the swarm 105. After a first operation phase (e.g., operation phase 215), there is a free slot (e.g., free slot 245).

The cycles continue to repeat to perform the ranging task. For example, there are additional communications (e.g. in the form of pings) from the bot 125 in the role as the top-tag T1 to the bots 125 in the role as the anchors A1, A2 and mirror M, and planning messages are returned from the bots 125 in the role as the anchors A1, A2 and mirror M to the bot 125 in the role of the top-tag T1 during a second planning phase 205a. During the second decision phase 210b, a decision message is again cascaded from the scheduler 360 of the bot 125 in the role of the top tag T1 to the swarm 105. During the second operation phase 215a, a new fifth both (e.g., a new bot 125 (RN)) attempts to join the swarm 105. In this example, the new bot 125 (RN) requested to join just before the second free slot 245a, which does not provide sufficient time for the analyzers 355 of the bots 125 in the role of the anchors A1, A2 and the mirror M to vote because the creation of the planning message does not occur until the next planning phase 205b. Likewise, the analyzer 355 and the scheduler 360 of the bot 125 in the role of the top-tag T1 does not have sufficient time to conduct any analysis or decision making because the next decision phase 210b is after the second free slot 245.

Figure 10B:
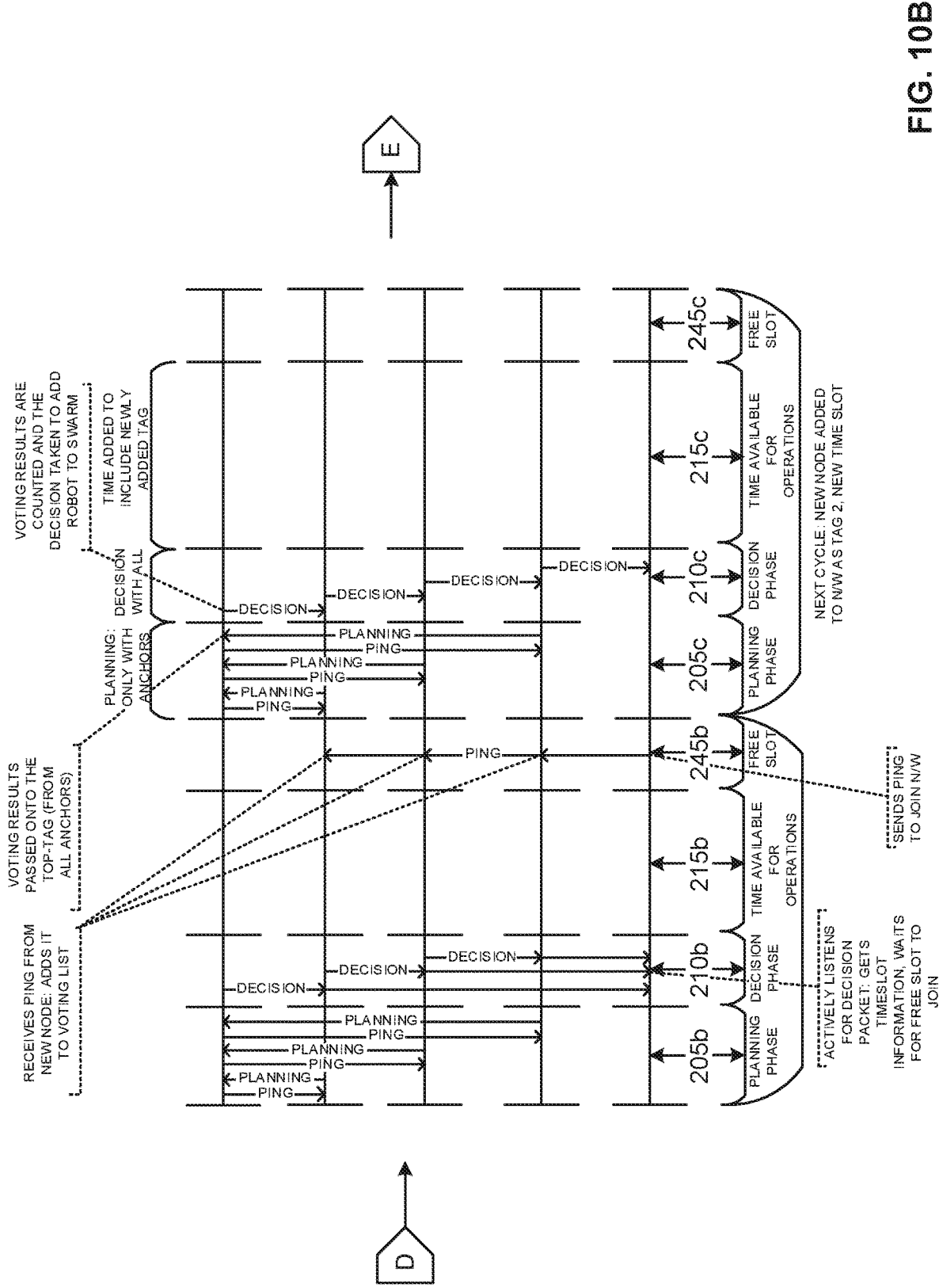

As shown in FIG. 10B, the join request from the new bot 125 (RN) is processed in the third planning phase 205b, and the analyzers 355 of the bots 125 in the role as the anchors A1, A2 and mirror M add the fifth bot 125 to the voting list. Subsequent communications (e.g. in the form of pings) from the bot 125 in the role as the top-tag T1 to the bots 125 in the role as the anchors A1, A2 and mirror M, and planning messages are returned from the bots 125 in the role as the anchors A1, A2 and mirror M to the bot 125 in the role of the top-tag T1 during the third planning phase 205b. Then a decision is made by the scheduler 360 of the bot 125 in the form of the top-tag T1 during the third decision phase 210b. A decision message is sent through the swarm 105 from the transceiver 330 of the bot 125 in the role as the top-tag T1 to the bots 125 in the role as the anchors A1, A2 and mirror M and the fifth bot 125, where it is indicated that the fifth bot 125 is allowed to join the swarm 125. However, a subsequent (e.g., third) operation phase 215b passes before the next (e.g., third) free slot 245b. At the next free slot 245, the fifth both 125 sends a communication (e.g., in the form of a ping) and joins the swarm 105.

Figure 10C:
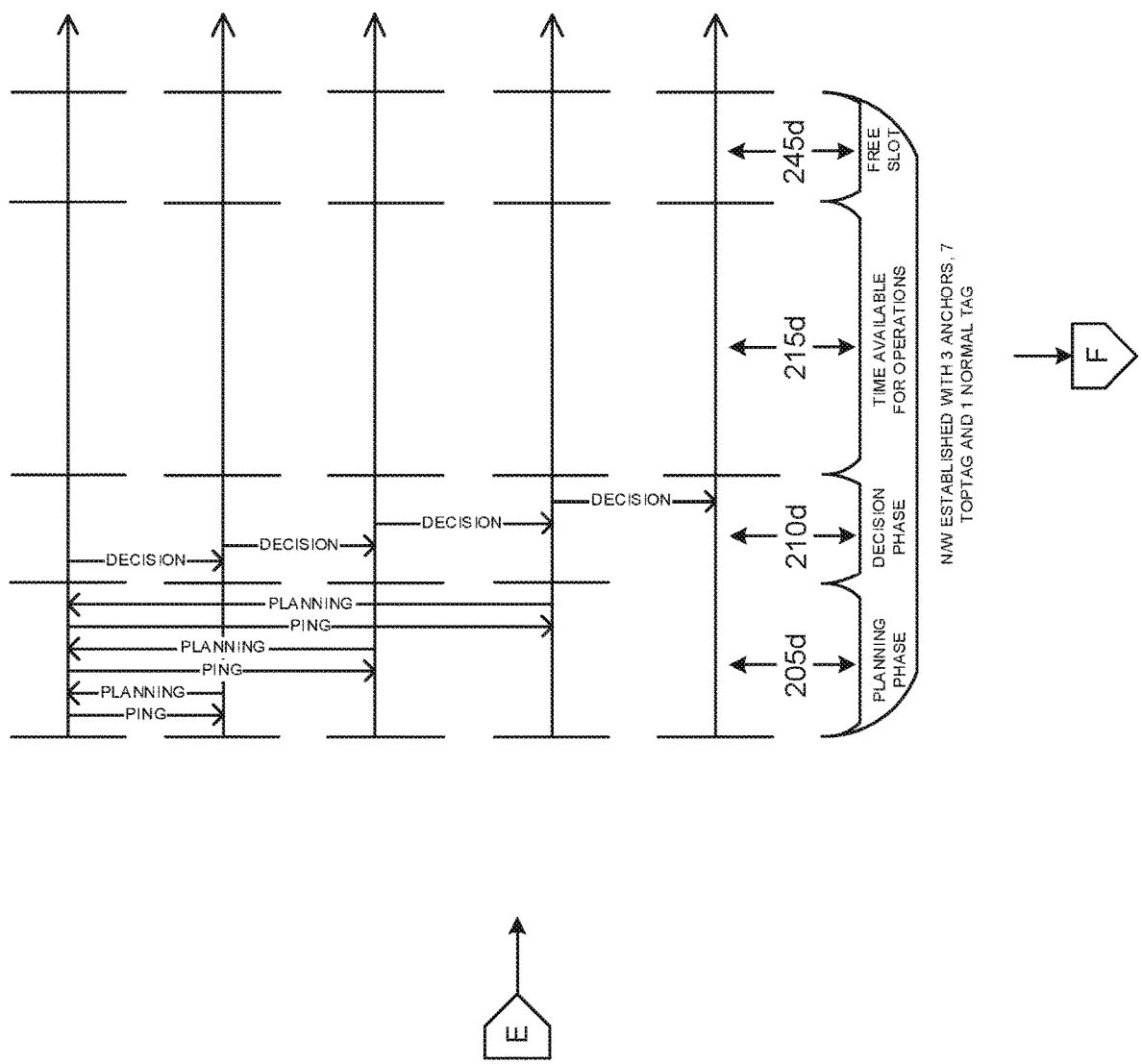

A subsequent (fourth) planning phase 205c, decision phase 210c, and operation phase 215c is executed with the fifth bot 125 in the swarm 125 as a bot 125 in the role of tag T2. Yet another subsequent (fifth) planning phase 205d, decision phase 210d, and operation phase 215d is executed with all five bots 125 as shown in FIG. 10C. This example shows five cycles through the schedule 100. In other examples, the scheduler 360 of the bot 125 in the role of the top tag T1 establishes a schedule with a different number of cycles. The number of cycles may be based on, for example, the resources of one or more of the bots 125, a time period, the task set 305, etc.

Figure 10D:
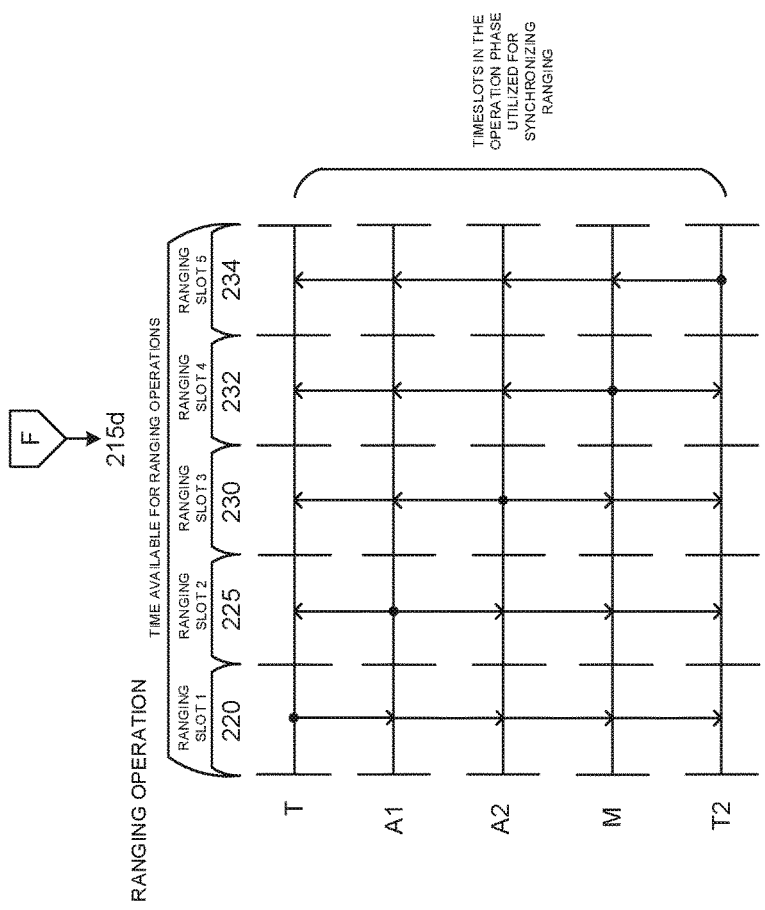

FIG. 10D shows the further details of the fifth operation phase 215d of FIG. 10C to accomplish the ranging task. As shown in FIG. 10D, the operation phase 215d includes five slots including, for example, first ranging slot 220, a second ranging slot 225, a third ranging slot 230, a fourth ranging slot 232, and a fifth ranging slot 234. Thus, the scheduler 360 of the bot 125 in the role of the top-tag T1 has established the five-slot operation phase 215.

During the first ranging slot 220, the bot 125 in the role of the top-tag T1 (or simply T) communicates a message that is received directly and/or indirectly (e.g., via cascade or chain of communications) to the other bots 125 in the swarm 105. During the second ranging slot 225, the bot 125 in the role of the anchor A1 communicates a message that is received directly and/or indirectly (e.g., via cascade or chain of communications) to the other bots 125 in the swarm 105. During the third ranging slot 230, the bot 125 in the role of the anchor A2 communicates a message that is received directly and/or indirectly (e.g., via cascade or chain of communications) to the other bots 125 in the swarm 105. During the fourth ranging slot 232, the bot 125 in the role of the mirror M communicates a message that is received directly and/or indirectly (e.g., via cascade or chain of communications) to the other bots 125 in the swarm 105. During the fifth ranging slot 234, the bot 125 in the role of the tag T2 communicates a message that is received directly and/or indirectly (e.g., via cascade or chain of communications) to the other bots 125 in the swarm 105. During the second slot 225, the third slot 230, and the fourth slot 232, the bots 125 in the roles of anchors A1, A2 and mirror M participate in the activities of the operation phase 215d to carry out the mission of the swarm 105, which in this example is a ranging mission. Thus, in this example, the bots 125 in the role of the anchors A1, A2 and mirror M operate as anchors and prepare the planning messages disclosed above and operate as tags to perform, in this example, ranging operations.

In the ranging operations, data is gathered regarding when a communication is sent from a bot 125 and when it is received at another bot 125. The communications are mirrored one or more times to account for clock drifts. The data is used to calculate distances. With sufficient data, positions can be calculated. Data regarding the positions of members of the swarm 105 is useful for effecting the task set 305. Furthermore, geographic data (e.g., how much area is covered, location data, GPS data, etc.) may be used by the swarm to avoid searching same area and for greater swarm coordination.

Figure 11:
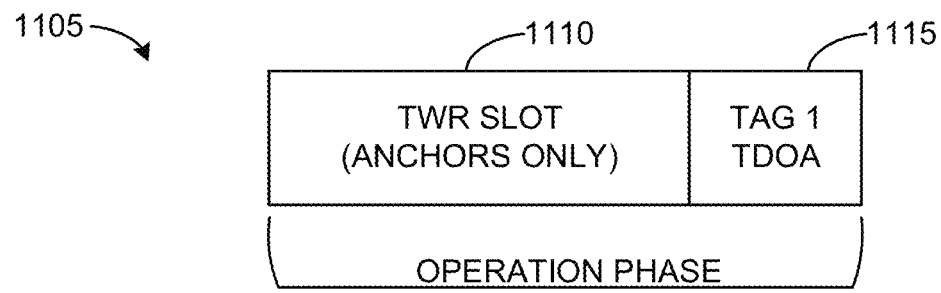
FIG. 11 is a diagram of another example operation phase of an example schedule.
Figure 12:
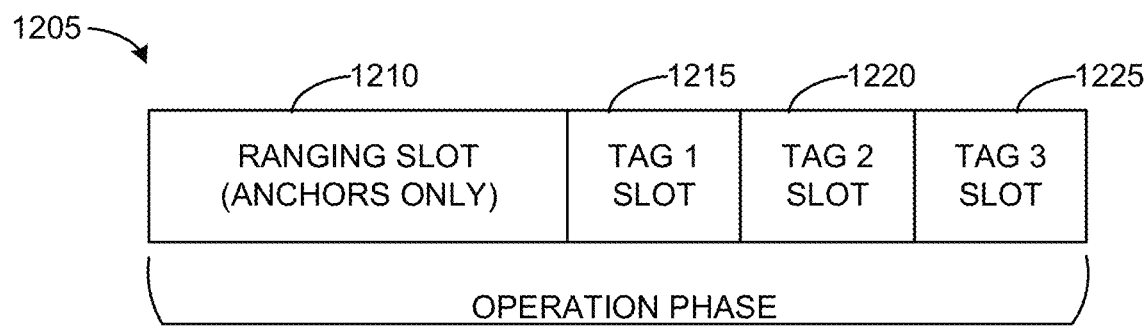
FIG. 12 is a diagram of yet another example operation phase of an example schedule.

FIG. 11 shows an alternative operation phase 1105 that includes a two-way ranging slot 1110 and a time difference on arrival slot (TDOA) 1115. The example of FIG. 11 can be used in examples with four bots 125. FIG. 12 shows yet another alternative operation phase 1205 that includes a ranging slot 1210, and three tag slots 1215, 1220, 1225 after additional bots 125 were added to the swarm.

Though FIGS. 10D, 11, and 12 show example implementations with a ranging task that is implemented in the operation phase 215, the swarm coordination systems, apparatus, and methods disclosed herein can be implemented with any desired operation phase 215.

Figure 13:
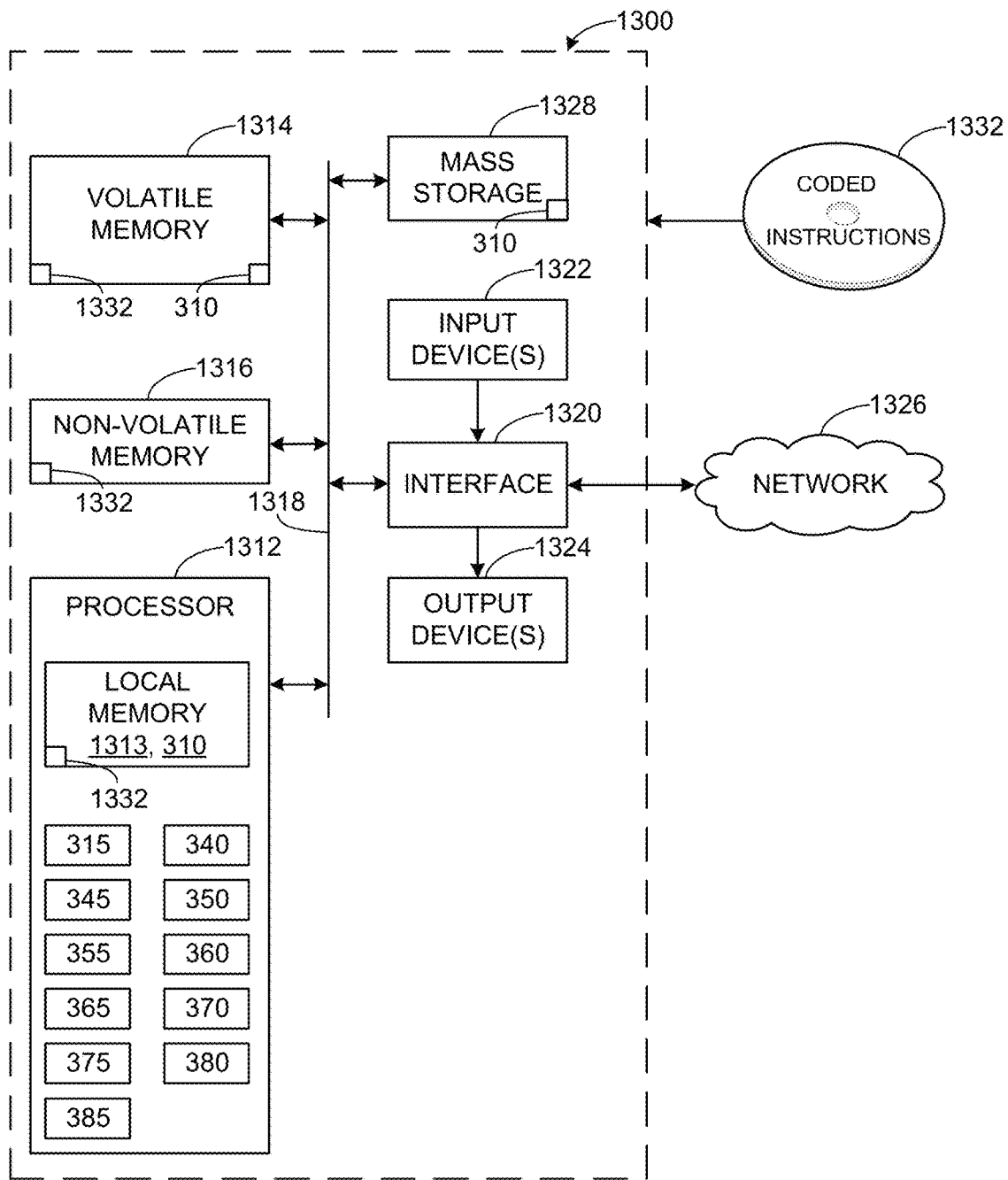
FIG. 13 is a block diagram of an example processor platform structured to execute the example machine readable instructions of FIGS. 9A-D to implement the example bot of FIGS. 1, 3, 4, 6, 7A-F, and 8.

FIG. 13 is a block diagram of an example processor platform 500 structured to execute the instructions of FIGS. 9A-D to implement the example bot 125 of FIGS. 1, 3, 4, 6, 7A-F, and 8. The processor platform 1300 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements one or more of or at least a portion of one or more of the example motor controller 315, the example sensors 340, the example requestor 345, the example clock 350, the example analyzer 355, the example scheduler 360, the example authenticator 365, the example counter 370, the example synchronizer 375, the example power switch 380, and/or the example processor 385.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 205, 1332 of FIG. 3 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed for a generic robot swarm coordination that can be used to coordinate swarms of bots with emergent behaviors for any desired operational implementation such as, for example, surveillance, search and rescue, mapping, ranging, farming, firefighting etc. Prior solutions required a different coordination scheme for different operational implementations. The onus of creating multiple coordination schemes increases complexity of the systems and, particularly to meet real time requirements. In addition, a plurality of swarm coordination schemes and need for continual development has high maintenance costs and typically results in overly complex coordination schemes.

Example methods, apparatus, systems and articles of manufacture for robot swarm propagation using virtual partitions are disclosed herein. Different aspects of the examples disclosed herein can be combined in other examples. Further examples and combinations thereof include the following.

Example 1 is a system to coordinate a swarm of bots. The system of Example 1 includes an analyzer to create a planning message based on data associated with a first bot and a second bot, the planning message to be communicated to the swarm from a first source. In addition, the system of Example 1 includes a scheduler to issue a first assignment of a first operation slot and a first role to the first bot based on the planning message, issue a second assignment of a second operation slot and a second role to the second bot based on the planning message, and create a decision message including the first assignment and the second assignment, the decision message to be communicated to the swarm from a second source different than the first source.

Example 2 includes the apparatus of Example 1, wherein the wherein the scheduler is to assign the first role an anchor role based on an order in which the first bot requested to join the swarm.

Example 3 includes the system of Example 2, wherein in the anchor role, the analyzer is to create the planning message based one or more of a prior execution of the first role, a prior execution of the second role, a first range of the first bot, or a second range of the second bot.

Example 4 includes the system of Example 1, wherein the scheduler is to communicate the decision message after issuing a threshold number of assignments.

Example 5 includes the system of Example 1, wherein the first bot is powered on during the first time slot and the first bot is in a low power mode during the second time slot.

Example 6 includes the system of Example 5, wherein the first bot is to receive communication during the second time slot.

Example 7 includes the system of Example 1, wherein the first bot uses a first communication protocol and the second bot uses a second communication protocol different from the first communication protocol.

Example 8 includes the system of Example 1, wherein the first role is based on a location of the first bot.

Example 9 includes the system of Example 1, wherein the first source includes a first transceiver and the second source includes a second transceiver.

Example 10 includes the system of Example 9, wherein the second transceiver is to receive a request to join the swarm from a third bot, and the scheduler is to process the request to join after the second operation slot.

Example 11 includes the system of Example 10, wherein after the request to join, the scheduler is to reissue the first assignment to a first one of the first bot, the second bot, or the third bot; reissue the second assignment to a second one of the first bot, the second bot, or the third bot; and issue a third assignment of a third operation slot and a third role to a third of the first bot, the second bot, or the third bot.

Example 12 includes the system of any of Examples 1-11, wherein the scheduler is to issue the first assignment and the second assignment after a threshold amount of time from receipt by the second transceiver of a prior decision message.

Example 13 is a system that includes a first bot including means for analyzing to create a planning message based on data associated with one or more bots in a swarm of bots. The system of Example 13 also includes a second bot including means for scheduling. The means for scheduling are to issue a first assignment of a first operation slot and a first role to a third bot based the planning message, issue a second assignment of a second operation slot and a second role to a fourth bot based on the planning message, and create a decision message including the first assignment and the second assignment. The system of Example 13 also includes means for communicating the decision message to the swarm.

Example 14 includes the system of Example 13, wherein the means for communicating is to receive a request from the first bot to join the swarm and the means for scheduling is to assign an anchor role to the first bot based on an order in which the first bot requested to join the swarm.

Example 15 includes the system of Example 14, wherein in the anchor role, the means for analyzing is to create the planning message based one or more of a prior execution of the first role, a prior execution of the second role, a first range of the third bot, or a second range of the fourth bot.

Example 16 includes the system of Example 13, wherein the means for scheduling is to broadcast the decision message after issuing a threshold number of assignments.

Example 17 includes the system of Example 13, wherein the third bot is powered on during the first time slot and the third bot is in a low power mode during the second time slot.

Example 18 includes the system of Example 17, wherein the third bot is to receive communication during the second time slot.

Example 19 includes the system of Example 13, wherein the third bot uses a first communication protocol and the fourth bot uses a second communication protocol different from the first communication protocol.

Example 20 includes the system of Example 13, wherein the first role is based on a location of the third bot.

Example 21 includes the system of Example 13, wherein the means for communicating is to receive a request to join the swarm from a fifth bot, and the means for scheduling is to process the request to join after the second operation slot.

Example 22 includes the system of Example 21, wherein after the request to join, the means for scheduling is to: reissue the first assignment to a first one of the first bot, the second bot, the third bot, the fourth bot, or the fifth bot; reissue the second assignment to a second one of the first bot, the second bot, the third bot, the fourth bot, or the fifth bot; and issue a third assignment of a third operation slot and a third role to a third of the first bot, the second bot, the third bot, the fourth bot, or the fifth bot.

Example 23 includes the system of any of Examples 13-22, wherein the means for scheduling is to issue the first assignment and the second assignment after a threshold amount of time from receipt by the communication means of a prior decision message from a different bot.

Example 24 is a non-transitory computer readable storage medium comprising computer readable instructions that, when executed, cause one or more processors to at least create a planning message based on data associated with a first bot and a second bot and communicate the planning message to a swarm of bots from a first source. The instructions of Example 24 also cause the machine to issue a first assignment of a first operation slot and a first role to the first bot based on the planning message. The instructions of Example 24 also cause the machine to issue a second assignment of a second operation slot and a second role to the second bot based on the planning message. In addition, the instructions of Example 24 cause the machine to create a decision message including the first assignment and the second assignment and communicate the decision message to the swarm from a second source different than the first source.

Example 25 includes the medium of Example 24, wherein the instructions further cause the machine assign the first role an anchor role based on an order in which the first bot requested to join the swarm.

Example 26 includes the medium of Example 24, wherein the instructions further cause the machine to communicate the decision message after issuing a threshold number of assignments.

Example 27 includes the medium of Example 24, wherein the instructions further cause the first bot to powered on during the first time slot and to enter a low power mode during the second time slot.

Example 28 includes the medium of Example 27, wherein the instructions further cause the first bot is to receive communication during the second time slot.

Example 29 includes the medium of Example 24, wherein the first bot uses a first communication protocol and the second bot uses a second communication protocol different from the first communication protocol.

Example 30 includes the medium of Example 24, wherein the first role is based on a location of the first bot.

Example 31 includes the medium of Example 24, wherein the instructions further cause the machine to receive a request to join the swarm from a third bot and process the request to join after the second operation slot.

Example 32 includes the medium of Example 31, wherein after the request to join, the instructions further cause the machine to: reissue the first assignment to a first one of the first bot, the second bot, or the third bot; reissue the second assignment to a second one of the first bot, the second bot, or the third bot; and issue a third assignment of a third operation slot and a third role to a third of the first bot, the second bot, or the third bot.

Example 33 includes the medium of Example 24, wherein the first source is a first transceiver and the second source is a second transceiver.

Example 34 includes the medium of any of Examples 24-33, wherein the machine is a first machine, and wherein the instructions further cause the machine to issue the first assignment and the second assignment after a threshold amount of time from receipt by the machine of a prior decision message from a second machine.

Example 35 is a method to coordinate a swarm of bots. The method of Example 35 includes receiving a request to join the swarm from a first bot and receiving a request to join the swarm from a second bot. The method of Example 35 also includes creating a planning message based on data associated with the first bot and the second bot and communicating the planning message to the swarm using a first source, issuing a first assignment of a first operation slot and a first role to a first bot based on the planning message, and issuing a second assignment of a second operation slot and a second role to a second bot based on the planning message. The method of Example 35 also includes creating a decision message including the first assignment and the second assignment and communicating the decision message to the swarm using a second source different than the first source.

Example 36 method of Example 35, further including assigning the first role an anchor role based on an order in which the first bot requested to join the swarm.

Example 37 includes the method of Example 36, further including creating the planning message based one or more of a prior execution of the first role, a prior execution of the second role, a first range of the first bot, or a second range of the second bot.

Example 38 includes the method of Example 35, further including communicating the decision message after issuing a threshold number of assignments.

Example 39 includes the method of Example 35, further including powering on the first bot during the first time slot and powering down the first bot to a low power mode during the second time slot.

Example 40 includes the method of Example 39, further including receiving, by the first bot, communication during the second time slot.

Example 40 includes the method of Example 35, further including communicating with the first bot using a first communication protocol and communicating with the second bot using a second communication protocol different from the first communication protocol.

Example 42 includes the method of Example 35, wherein the first role is based on a location of the first bot.

Example 43 includes the method of Example 35, further including receiving a request to join the swarm from a third bot; and processing the request to join after the second operation slot.

Example 44 includes the method of Example 43, further including: reissuing the first assignment to a first one of the first bot, the second bot, or the third bot after the request to join; reissuing the second assignment to a second one of the first bot, the second bot, or the third bot after the request to join; and issuing a third assignment of a third operation slot and a third role to a third of the first bot, the second bot, or the third bot after the request to join.

Example 45 includes the method of Example 35, wherein the first source is a first transceiver and the second source is a second transceiver.

Example 46 includes the method of any of Examples 35-45, further including issuing the first assignment and the second assignment after a threshold amount of time from receipt of a prior decision message.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to coordinate a plurality of bots, the system comprising:
a first bot; and
a second bot different than the first bot,
the first bot including:
an analyzer to create a planning message based on data associated with a third bot and a fourth bot; and
a first transceiver to communicate the planning message to the plurality of bots; and
the second bot including:
a scheduler to:
issue a first assignment of a first operation slot and a first role to the third bot based on the planning message;
issue a second assignment of a second operation slot and a second role to the fourth bot based on the planning message; and
create a decision message including the first assignment and the second assignment; and
a second transceiver to communicate the decision message to the plurality of bots.

2. The system of claim 1, wherein the first bot and the third bot are the same bot, and the scheduler is to assign the first role to the first bot based on an order in which the first bot requested to join the plurality of bots.

3. The system of claim 2, wherein in the first role, the analyzer is to create the planning message based one or more of a prior execution of the first role, a prior execution of the second role, a first range of the first bot, or a second range of the fourth bot.

4. The system of claim 1, wherein the scheduler is to communicate the decision message after issuing a threshold number of assignments.

5. The system of claim 1, wherein the third bot is powered on during the first time slot and the first bot is in a low power mode during the second time slot.

6. The system of claim 5, wherein the third bot is to receive communication during the second time slot.

7. The system of claim 1, wherein the third bot uses a first communication protocol and the fourth bot uses a second communication protocol different from the first communication protocol.

8. The system of claim 1, wherein the first role is based on a location of the third bot.

9. The system of claim 1, wherein the second transceiver is to receive a request to join the plurality of bots from a fifth bot, and the scheduler is to process the request to join after the second operation slot.

10. The system of claim 9, wherein after the request to join, the scheduler is to:
reissue the first assignment to a first one of the third bot, the fourth bot, or the fifth bot;
reissue the second assignment to a second one of the third bot, the fourth bot, or the fifth bot; and
issue a third assignment of a third operation slot and a third role to a third of the third bot, the fourth bot, or the fifth bot.

11. The system of claim 1, wherein the scheduler is to issue the first assignment and the second assignment after a threshold amount of time from receipt by the second transceiver of a prior decision message.

12. The system of claim 1, wherein the first bot and the third bot are the same bot, and the second bot and the fourth bot are the same bot.

13. The system of claim 1, wherein the analyzer is to create the planning message during a planning phase at a first time, the scheduler is to create the decision message during a decision phase at a second time after the first time, and the first operation slot and second operation slot occur during an operation phase at a third time after the second time,
the third bot is configured to communicate with the plurality of bots during the first operation slot, and the fourth bot is prevented from communicating with the plurality of bots during the first operation slot, and
the fourth bot is configured to communicate with the plurality of bots during the second operation slot, and the third bot is prevented from communicating with the plurality of bots during the second operation slot.

14. The system of claim 1, wherein the third bot is to send a first operation message to the plurality of bots during the first operation slot, and the decision message is appended to the first operation message.

15. The system of claim 14, wherein the second operation slot occurs after the first operation slot, the fourth bot is to send a second operation message to the plurality of bots during the second operation slot, and the decision message is appended to the second operation message.

16. A system comprising:
a first bot including:
means for analyzing to create a planning message based on data associated with one or more bots in a plurality of bots; and
first means for communicating, the first means for communicating to communicate the planning message to the plurality of bots; and
a second bot, different than the first bot, the second bot including:
means for scheduling to:
issue a first assignment of a first operation slot and a first role to a third bot based the planning message;
issue a second assignment of a second operation slot and a second role to a fourth bot based on the planning message; and
create a decision message including the first assignment and the second assignment; and
second means for communicating, the second means for communicating to communicate the decision message to the plurality of bots.

17. The system of claim 16, wherein the second means for communicating is to receive a request from the first bot to join the plurality of bots swarm and the means for scheduling is to assign an anchor role to the first bot based on an order in which the first bot requested to join the plurality of bots.

18. The system of claim 17, wherein in the anchor role, the means for analyzing is to create the planning message based one or more of a prior execution of the first role, a prior execution of the second role, a first range of the third bot, or a second range of the fourth bot.

19. The system of claim 16, wherein the third bot is powered on during the first time slot and the third bot is in a low power mode during the second time slot.

20. The system of claim 19, wherein the third bot is to receive communication during the second time slot.

21. The system of claim 16, wherein the second means for communicating is to receive a request to join the plurality of bots from a fifth bot, and the means for scheduling is to process the request to join after the second operation slot.

22. The system of claim 21, wherein after the request to join, the means for scheduling is to:
   reissue the first assignment to a first one of the first bot, the second bot, the third bot, the fourth bot, or the fifth bot;
   reissue the second assignment to a second one of the first bot, the second bot, the third bot, the fourth bot, or the fifth bot; and
   issue a third assignment of a third operation slot and a third role to a third of the first bot, the second bot, the third bot, the fourth bot, or the fifth bot.

23. The system of claim 16, wherein the second means for communicating is to receive a prior decision from a different, and the means for scheduling is to issue the first assignment and the second assignment after a threshold amount of time from receipt of the prior decision message from a different bot.

24. A non-transitory computer readable storage medium comprising computer readable instructions that, when executed, cause one or more processors to at least:
   create a planning message based on data associated with a first bot and a second bot;
   communicate the planning message to a plurality of bots from a first source;
   issue a first assignment of a first operation slot and a first role to the first bot based on the planning message;
   issue a second assignment of a second operation slot and a second role to the second bot based on the planning message;
   create a decision message including the first assignment and the second assignment; and
   communicate the decision message to the plurality of bots from a second source different than the first source.

25. The storage medium of claim 24, wherein the instructions further cause the machine to:
   to receive a request to join the plurality of bots from a third bot; and
   process the request to join after the second operation slot.

26. The storage medium of claim 25, wherein after the request to join, the instructions further cause the machine to:
   reissue the first assignment to a first one of the first bot, the second bot, or the third bot;
   reissue the second assignment to a second one of the first bot, the second bot, or the third bot; and
   issue a third assignment of a third operation slot and a third role to a third of the first bot, the second bot, or the third bot.

27. The storage medium of claim 24, wherein the machine is a first machine, and wherein the instructions further cause the first machine to issue the first assignment and the second assignment after a threshold amount of time from receipt by the first machine of a prior decision message from a second machine.

28. A method to coordinate a swarm of bots, the method comprising:
   receiving a request to join the swarm from a first bot;
   receiving a request to join the swarm from a second bot;
   creating, by executing instructions with a first processor in an anchor bot, a planning message based on data associated with the first bot and the second bot;
   communicating, via a first transceiver of the anchor bot, the planning message to the swarm;
   issuing, by executing instructions with a second processor in a top-tag bot, a first assignment of a first operation slot and a first role to a first bot based on the planning message, the top-tag bot different than the anchor bot;
   issuing, by executing instructions with the second processor, a second assignment of a second operation slot and a second role to a second bot based on the planning message;
   creating, by executing instructions with the second processor, a decision message including the first assignment and the second assignment; and
   communicating, via a second transceiver of the top-tag bot, the decision message to the swarm.

\* \* \* \* \*